US012810180B1

(12) United States Patent
Rausenberger

(10) Patent No.: US 12,810,180 B1
(45) Date of Patent: Nov. 24, 2026

(54) MULTITHINK: METHOD AND SYSTEM FOR ADAPTIVE MULTI-AGENT REASONING THROUGH STRUCTURED DIALOGUE AND SYNTHESIS

(71) Applicant: Brad Rausenberger, Jamestown, NC (US)

(72) Inventor: Brad Rausenberger, Jamestown, NC (US)

( * ) Notice: Subject to any disclaimer, the term of this patent is extended or adjusted under 35 U.S.C. 154(b) by 10 days.

(21) Appl. No.: 19/550,247

(22) Filed: Feb. 25, 2026

(51) Int. Cl.
*G06N 5/04* (2023.01)

(52) U.S. Cl.
CPC .................................... *G06N 5/04* (2013.01)

(58) Field of Classification Search
CPC ........................................................ G06N 5/04
See application file for complete search history.

(56) References Cited

U.S. PATENT DOCUMENTS

2025/0259085 A1 * 8/2025 Crabtree ................ G06N 5/043

* cited by examiner

*Primary Examiner* — Casey R. Garner

(57) ABSTRACT

The invention relates to computer-implemented systems and methods for adaptive multi-agent reasoning. Multiple artificial-intelligence agents may engage in structured interaction around an input signal, and the system may manage agent dialogue, evaluate agent contributions, and produce a synthesized output. Certain embodiments may employ coordinated control mechanisms including a contiguous agent-state tensor, vectorized similarity computation, rolling-window drift detection, and conflict-weighted routing. In some embodiments, a hardware-accelerated kernel may compute similarity values and update drift statistics using deterministic atomic operations to support parallel execution. These mechanisms may exhibit computational characteristics such as coalesced memory-access patterns, consistent update ordering, and coherent multi-agent operation across heterogeneous-hardware environments.

27 Claims, 8 Drawing Sheets

MULTITHINK: METHOD AND SYSTEM FOR ADAPTIVE MULTI-AGENT REASONING THROUGH STRUCTURED DIALOGUE AND SYNTHESIS

STATEMENT REGARDING FEDERALLY SPONSORED RESEARCH OR DEVELOPMENT

Not Applicable.

FIELD OF THE INVENTION

The present invention relates generally to computer-implemented systems and methods for coordinating interactions among multiple artificial intelligence agents. In various embodiments, the invention may support structured multi-agent reasoning, adaptive interaction processes, user-influenced control mechanisms, or other forms of coordinated agent interaction.

SUMMARY OF THE INVENTION

The invention relates to systems and methods for managing, coordinating, and synthesizing interactions among multiple computational agents. The concepts described herein may be implemented using a variety of software architectures and hardware platforms. The following summary provides a general overview and is not intended to limit the scope of the invention.

In various embodiments, the systems and methods may allow multiple agents, potentially having differing roles, characteristics, or reasoning tendencies, to participate in structured exchanges involving user input or system-generated prompts. These interactions may include processes such as generating responses, evaluating relationships among agent outputs, identifying semantic-changes, determining routing priorities, or synthesizing contributions into consolidated results. Other forms of interaction may also be used.

Certain embodiments may employ coordinated or ordered processing techniques to support stable, coherent, or predictable multi-agent operation. The invention is not limited to any particular data structure, algorithm, or computational approach, and may be implemented using a wide range of representations, update procedures, or processing strategies.

The disclosed systems and methods may further allow users or external systems to influence agent interaction through configurable parameters or control mechanisms. The architecture may be adapted for use in applications such as ideation, analysis, decision support, education, or other contexts involving structured multi-agent interaction. The invention is not limited to any particular application or implementation.

BRIEF DESCRIPTION OF THE DRAWINGS

The figures described herein illustrate exemplary embodiments and are not necessarily drawn to scale.

DETAILED DESCRIPTION OF THE INVENTION

Figure 1:
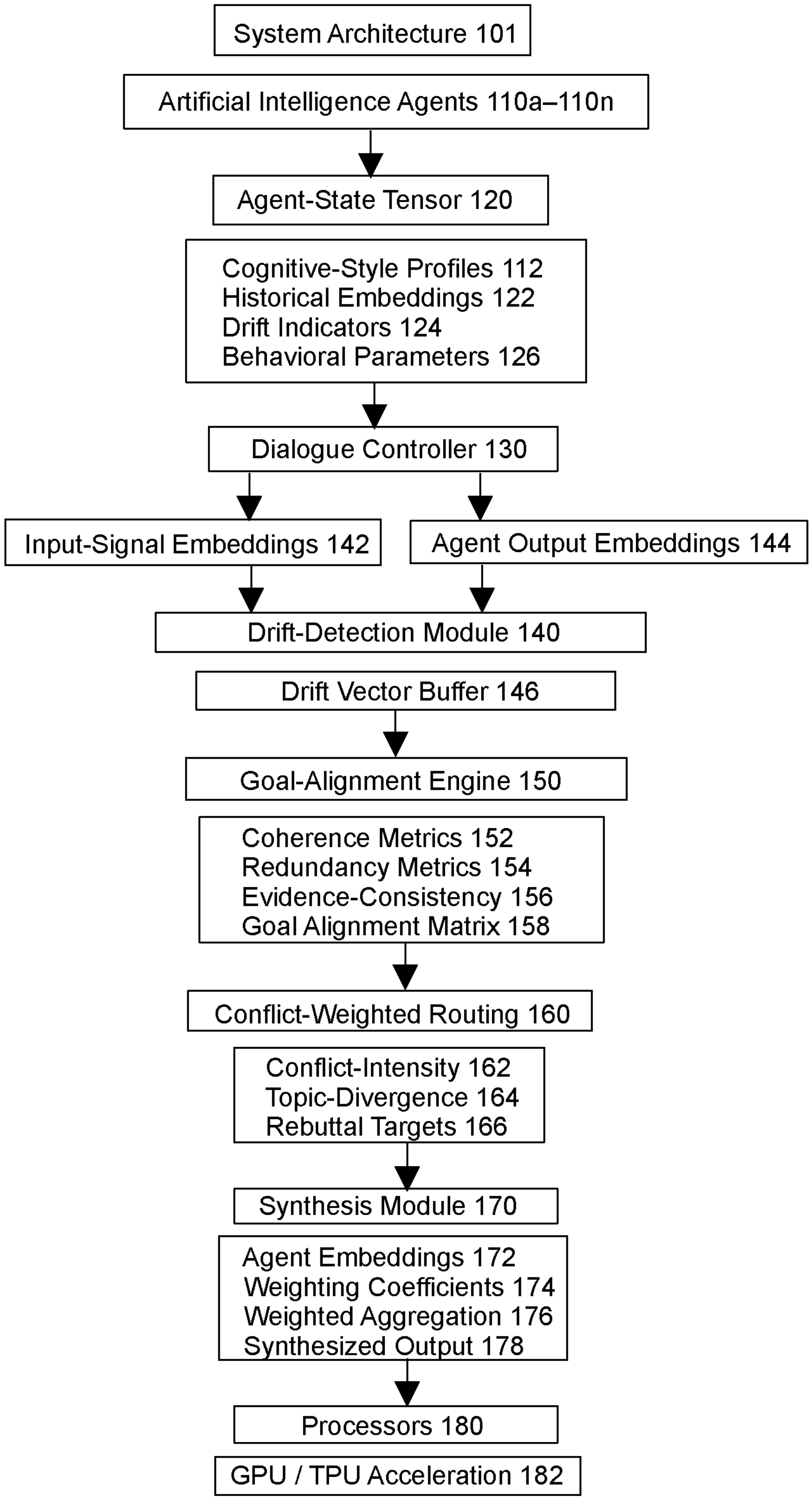
FIG. 1 is a diagram of an example system architecture for adaptive multi-agent reasoning.

The following detailed description presents illustrative embodiments and is not intended to limit the scope of the claims. The embodiments described herein relate to systems and methods for adaptive multi-agent reasoning that may utilize structured dialogue processes, drift-monitoring techniques, conflict-weighted routing strategies, goal-alignment scoring, synthesis weighting, or other coordinated interaction mechanisms. In certain implementations, the system may employ optional data structures, vector-space operations, or hardware-accelerated computations to support coherent and stable multi-agent behavior. By way of example and not limitation, some embodiments may use structures such as an agent-state tensor, hardware-accelerated similarity computations, circular-buffer indexing, or update procedures configured to support reduced kernel-interaction overhead, reduced memory fragmentation, or reduced redundant recomputation.

Definitions

As used herein, the following terms are provided for clarity and convenience and are not intended to limit the scope of the invention. The definitions are illustrative rather than exhaustive, and encompass functional equivalents, alternative formulations, and related interpretations unless the context clearly indicates otherwise.

Agent refers to any artificial intelligence model, sub-model, module, process, or computational entity capable of generating responses, participating in structured interaction, or expressing a reasoning position. Agents may be implemented using neural networks, symbolic systems, hybrid architectures, or any other computational technique. In one non-limiting embodiment, an agent may be instantiated as a transformer encoder that produces a D-dimensional embedding vector xi. For example, a 6-layer or 12-layer transformer encoder may process internal state or dialogue context and emit a D-dimensional embedding written into the agent-state tensor at row i.

Agent-state tensor may refer to any data structure configured to store per-agent information such as cognitive-style parameters, role identifiers, historical embeddings, drift indicators, or behavioral-tendency vectors. In some hardware-accelerated embodiments, the agent-state tensor may be implemented as a contiguous, row-major MxD floating-point matrix in which each row corresponds to one agent and occupies D consecutive values. Optional row alignment or padding (e.g., 128-byte or 256-byte alignment) may be used to support favorable memory-access patterns on vectorized hardware.

agent_weights and agent_scores may refer to arrays, lists, tensors, or other data structures that store per-agent numeric values used by routing, selection, synthesis, or related routines. In some embodiments, these structures may be stored contiguously to support vectorized computation on GPU, TPU, CPU, or other hardware. Equivalent or alternative representations may be used. Alignment-metrics may refer to scalar or vector-valued quantities that evaluate how closely an agent's output conforms to behavioral, semantic, coherence, redundancy, evidence-consistency, safety, or other objectives. In some embodiments, alignment-metrics may be computed using one or more of: (a) similarity between an agent's output embedding and a reference-embedding, (b) divergence from prohibited or off-topic embedding regions, (c) consistency with prior agent outputs, (d) adherence to system-defined constraints (e.g., evidence weight, rebuttal threshold, creativity bias), (e) externally supplied reward or preference signals, or (f) weighted combinations of evaluative signals such as cosine similarity or cross-entropy. Metrics may be normalized or unbounded depending on the embodiment. Alignment-metrics may be stored in the agent-state tensor and may influence routing priorities, synthesis weighting, drift-thresholds, or corrective actions. Equivalent formulations, including learned alignment-scores or multi-dimensional alignment vectors, are contemplated.

Alignment-score may refer to any scalar or vector metric that evaluates how well an agent's output satisfies coherence, redundancy, evidence-consistency, or other evaluative criteria. Alignment-scores may be computed using linear-combinations, nonlinear transforms, learned scoring models, or any equivalent mechanism. In some embodiments, alignment-scores may be stored in a contiguous array (e.g., agent_alignment[M]) for vectorized processing, although other storage formats may be used. Atomic exchange publish may refer to any device-side or host-side atomic operation that atomically replaces the value stored at a publication pointer with a newly computed value and returns the prior value. In some embodiments, such operations may use acquire-release semantics to ensure visibility of preceding writes. Platform-appropriate examples include CUDA atomicExch, C++ std::atomic_exchange, TPU/XLA atomic operations, FPGA logic, or other equivalent primitives. No particular primitive or memory-ordering mechanism is required unless expressly recited in the claims.

AtomicAdd semantics may refer to any atomic fetch-and-add operation that returns the prior value and ensures a unique prior value per invocation under concurrent execution. Platform-appropriate examples include CUDA atomicAdd, ROCm atomic_fetch_add, OpenCL atomics, Metal atomics, Vulkan compute atomics, WebGPU atomics, CPU atomic operations, FPGA logic, or other equivalent mechanisms. In some embodiments, implementations on non-GPU platforms may map fetch-and-add semantics to platform-appropriate primitives, such as an acquire-release CAS loop on CPU (e.g., atomic_compare_exchange_strong), a hardware monotonic counter with arbitration logic on FPGA, or TPU/XLA AtomicRMW or equivalent operations. In certain embodiments, deterministic indexing may be supported using acquire-release semantics or device or system fences. CAS loop pseudocode (CPU fallback) may refer to an example of how certain CPU implementations can emulate GPU-style atomicAdd semantics using an acquire-release compare-and-swap loop. In some embodiments, pseudocode such as the following may be used to update a drift buffer or running-sum.

```
prior=atomic_fetch_add(&head_ptr, 1);
write_index=prior % N;
old=atomic_load_acquire(&drift_buffer[write_index]);
do {
  cur=atomic_load_acquire(&sum_ptr);
  cand=cur+(s−old);
} while (!atomic_compare_exchange_strong_acq_rel
  (&sum_ptr, &cur, cand));
atomic_store_release(&rolling_mean_ptr, cand/N);
drift_buffer[write_index]=s;
```

Other CPU or device-side mechanisms may be used. In some embodiments, ABA or wraparound hazards may be mitigated using version tags, epoch counters, sequence-numbers, or other techniques.

cognitive-style may refer to any parameterization, heuristic, embedding, rule set, or behavioral profile that influences how an agent interprets inputs, generates responses, or participates in multi-agent reasoning. Cognitive-styles may be static or dynamically updated using reinforcement-learning, gradient-based methods, heuristic adjustments, user-directed nudges, or any equivalent mechanism.

compute_contribution may refer to any heuristic, function, or formula that estimates an agent's contribution to observed drift. In some embodiments, compute_contribution(i) may be a weighted combination of similarity deltas, activity counts, topical-novelty scores, or other evaluative signals. conflict-intensity may refer to any scalar value that quantifies the degree of disagreement between two agent embeddings or outputs. In one embodiment, conflict-intensity may be computed as: 1−cosine_similarity(x_i, x_j), where cosine_similarity (a, b)=(a·b)/(||a||_eps*||b||_eps). Equivalent formulations using alternative vector-space metrics or distance functions are contemplated. conflict-weighted routing may refer to any prioritization mechanism that determines which agents should rebut or respond to others based on conflict-intensity, topic-divergence, or related metrics, and in some embodiments a routing computation may produce a weight w_i for each agent using a formula such as w_i=alpha*conflict_intensity i+beta*topic_divergence_i, with weights stored in a contiguous array (e.g., agent_weights[M]) or any equivalent structure and top-K selection performed using deterministic routines such as partial quickselect, radix-selection, or other algorithms.

controller or dialogue controller may refer to any module, process, or computational mechanism that coordinates agent interactions, manages rebuttal cycles, computes routing decisions, updates drift or alignment-metrics, or synthesizes agent outputs. The controller may operate as a device-level kernel, a host-coordinated process, a distributed orchestration mechanism, or any equivalent architecture. correction_log may refer to any persistent or transient log that records corrective actions applied to agents or system state. In some embodiments, a log entry may include an agent identifier, an action type (e.g., reweighting or embedding correction), action parameters, timestamps, or other metadata. Equivalent logging structures or reconciliation mechanisms may be used.

designated-writer may refer to an embodiment in which a single thread, warp, block, device, or host component is responsible for publishing updates to shared state such as rolling_mean_ptr. In some embodiments, the designated-writer may perform release-ordered stores of sequence-numbers or computed values, while readers perform acquire-ordered loads to ensure consistent observation. Equivalent mechanisms, including atomic exchange, sequence counters, or version tags, may be used.

designated-writer region may refer to any memory region or logical responsibility zone assigned to a designated-writer for publishing shared-state updates. In some embodiments, arbitration may be avoided by ensuring that only the designated-writer performs publication operations, while other threads compute local deltas or intermediate values. Distributed embodiments may coordinate a designated-writer region using host-side or device-side leader election, epoch counters, Lamport timestamps, or equivalent techniques.

deterministic circular buffer indexing may refer to any technique for obtaining a unique write position for concurrent updates, such as performing an atomic fetch-and-add on head_ptr and computing an index as the prior counter value modulo N. In some embodiments, deterministic behavior may rely on atomic primitives that return the prior value and may use memory fences or host-side synchronization to ensure visibility across devices. Platform mappings (e.g., CPU CAS loop, FPGA monotonic counter, TPU/XLA AtomicRMW, host-coordinated multi-GPU counters) may be used depending on the implementation.

deterministic tie-breaking may refer to any stable ordering rule applied when two or more agents have equal priority, selection score, or routing weight. In some embodiments, ties may be broken using a tuple such as (priority,−last_update_seq,agent_id), where last_update_seq may be a monotonically increasing sequence-number stored in the agent-state tensor. Other deterministic or non-deterministic tie-breaking rules may be used.

device fence and host-synchronization may refer to any device-level or host-level memory-ordering primitive used to ensure visibility of writes across threads, blocks, devices, or host processes. Examples include CUDA_threadfence( ), OpenCL mem_fence, or host-side calls such as cudaDeviceSynchronize( ). Platform-appropriate alternatives may also be used. domain-agnostic may refer to applicability across multiple fields, industries, or subject areas without requiring domain-specific tuning.

drift, semantic drift, or numerical drift may refer to any deviation from a user-defined input-signal, objective, or topic. Drift may be measured using semantic similarity, rule-based heuristics, statistical models, or any computational technique. Semantic drift may refer to deviations in meaning or topic, while numerical drift may refer to the deviation between a newly computed agent-input similarity value and a rolling-window mean of prior similarity values stored in a drift vector buffer. drift vector buffer may refer to any data structure configured to store recent similarity values for one or more agents. In some embodiments, the buffer may be implemented as a circular buffer of length N, updated using deterministic or non-deterministic indexing techniques. One embodiment may compute a write index as prior value % N, where prior value is returned by an atomic fetch and add on a device-side counter. The drift vector buffer may be used with a running-sum or rolling-mean pointer, although other mechanisms may be employed.

eps may refer to any small positive constant used to avoid division by zero or numerical instability in similarity computations. Example values include 1e-8, although other values may be used depending on the embodiment.

epsilon-guarded norm may refer to any stabilized vector norm of the form ||v||_eps=max(||v||_2, eps), where eps is a small positive constant. Other stabilization techniques may be used. equivalent vector-space metric may refer to cosine similarity, normalized dot-product, Euclidean distance on normalized vectors, Manhattan distance, or any metric that preserves relative similarity relationships in embedding-space.

fixed-point accumulator parameters may refer to any scale factor S and accumulator width W used when mapping floating-point similarity values to integer accumulators. In some embodiments, S may be chosen such that S*N fits within a selected integer width. Numerical examples (e.g., S=2^24, W=64) may be used, although other scaling strategies may be employed. fixed-point scaling may refer to mapping floating-point similarity values s to integer representations using a scale factor S, such as s_int=round(s*S). Some embodiments may use S=2^24 to preserve precision while allowing alternative scale factors or rounding rules.

Goal-alignment may refer to the degree to which agent reasoning converges toward a user-defined objective, including coherence, agreement, consistency, or other evaluative metrics. This term does not require any particular metric or evaluation method.

head_ptr may refer to any monotonically increasing counter used to obtain unique write positions for concurrent updates to a buffer. In some embodiments, head_ptr may be implemented as a 64-bit integer, but other widths or overflow handling strategies (e.g., version tags, epoch counters, quiescent resets, checkpointing) may be used.

host read visibility may refer to the conditions under which host-side code may safely observe device-side updates. In some embodiments, visibility may require a device-wide synchronization point (e.g., cudaDeviceSynchronize( ) or equivalent) and acquire-ordered loads. Platform-appropriate alternatives may also be used.

input-signal may refer to any user provided instruction, query, message, or initiating content processed by the system. The input-signal may be represented as text, tokens, embeddings, vectors, programmatic signals, or any computational representation.

Lamport timestamp may refer to any logical clock value used to order events in distributed systems. In some embodiments, corrective events appended to a correction log may include a Lamport timestamp to support deterministic merging across hosts.

machine learning training pipeline may refer to any embodiment in which thresholds, routing policies, or aggregation weights are learned from data. Training may use historical interactions, semantic-change patterns, task performance outcomes, or other signals. Models may be optimized using supervised, unsupervised, or reinforcement-learning objectives.

meta metrics may refer to higher-level evaluative quantities derived from agent behavior over time, including reliability, calibration, stability, trustworthiness, or other measures. Meta metrics may be stored in the agent-state tensor and may influence routing, weighting, or synthesis decisions. Equivalent or alternative formulations may be used.

multimodal fusion may refer to any process that combines embeddings or representations from multiple modalities (e.g., text, image, audio, video, sensor data) into a unified representation. In some embodiments, each modality embedding e_m may be projected into a shared space using a learned or configured projection P_m, and a fused embedding may be computed using weighted combinations such as e_fused=sum_m (w_m*(P_m*e_m)), where w_m may be stored in the agent-state tensor or produced by a learned fusion layer. Other fusion mechanisms may also be used. module may refer to any software, hardware, logical, or hybrid component configured to perform a function described herein. Modules may be distributed, centralized, virtualized, containerized, or implemented using any computational architecture.

P1 deterministic computability may refer to any temporally smoothed similarity structure that produces deterministic outputs from a finite, ordered sequence of recent similarity inputs using a fixed-update-rule. Deterministic computability may include deterministic update-ordering and deterministic resolution of concurrent updates on parallel hardware. An exponential moving average with a fixed smoothing factor is one example; other formulations may be used.

P2 bounded-state may refer to any temporally smoothed similarity structure that maintains internal state whose size does not grow without bound over time. Examples include fixed-size accumulators, fixed-length circular buffers, fixed-width windows, or fixed sets of coefficients. Other bounded-state mechanisms may be used.

P3 publication-semantics may refer to any mechanism by which a temporally smoothed similarity structure exposes a defined publication-event after which readers performing acquire-ordered loads may observe the published statistic and all contributing writes. Publication-semantics may be implemented using atomic exchange, release ordered stores, sequence-number tagging, epoch-tagging, or equivalent operations.

partial quickselect may refer to any algorithmic routine that selects the top K elements by value without fully sorting the array. In some embodiments, partial quickselect may be implemented in vectorized, block-parallel, or multi-threaded forms.

platform-appropriate atomic primitives may refer to CPU, FPGA, TPU, GPU, or other hardware-specific atomic operations that provide deterministic or semantically equivalent fetch and add behavior.

priority score may refer to any per-agent numeric value used to prioritize agent actions. In some embodiments, a priority score may be computed using a function such as p_i=softplus(u^T [e_i; e_input; c_i]), where [e_i; e_input; c_i] denotes vector concatenation and u is a learned or configured weight vector. Priority scores may be stored in contiguous arrays or any equivalent structure.

rolling-mean correctness invariant may refer to any concurrency correctness property maintained by a rolling-mean computation. In some embodiments, the invariant may state that, under specified atomic update-ordering and memory ordering guarantees, the published rolling-mean equals the arithmetic mean of the most recent N similarity values according to a deterministic write ordering. Alternative embodiments may use host-synchronization, epoch markers, or other visibility mechanisms.

rolling_mean_ptr may refer to any device-visible location that stores a published rolling-mean for low latency readers. In some embodiments, updates may be performed atomically with acquire-release semantics, but other publication mechanisms may be used.

rolling-window mean may refer to the arithmetic mean of the most recent N similarity values stored in a drift vector buffer. In some embodiments, the rolling-window mean may be maintained using an atomic running-sum update such as delta=s_t−old and mu_t=sum_ptr/N.

routing function f may refer to any deterministic or learned function that maps conflict-intensity, topic-divergence, alignment-metrics, or other features to a routing weight. Examples include f(C_i, D_i)=alpha*C_i+beta*D_i, although nonlinear transforms, learned models, or additional features may also be used.

selection score may refer to any per-agent numeric value used to rank or select agents for tasks such as rebuttal generation or synthesis. In some embodiments, a selection score may be computed as s_i=gamma*alignment_i+(1−gamma)*(1−redundancy_i), and selection scores may be stored in contiguous arrays or any equivalent structure.

structured dialogue may refer to any coordinated interaction among agents, including rebuttal cycles, turn taking, targeted responses, adversarial testing, or other controlled interplay. Structured dialogue may operate over natural-language content, embeddings, vectors, programmatic signals, code representations, abstract syntax structures, or any other computational representation. Structured dialogue may be synchronous, asynchronous, or implemented using any suitable mechanism. sum_ptr may refer to any device-visible or host-visible running-sum used to compute a rolling-window mean. The specific update mechanism may vary.

synthesis may refer to any process that aggregates, combines, integrates, or fuses agent outputs into a consolidated representation. Examples include weighted vector aggregation, softmax normalized weighting, attention based fusion, mixture-of-experts gating, rule-based summarization, or any equivalent mechanism.

topic-divergence may refer to any measure of semantic deviation between an agent's output and a reference topic, input-signal, or consensus representation. In some embodiments, topic-divergence may be computed using cosine distance, Euclidean distance on normalized embeddings, or other vector-space metrics. Topic-divergence may also be computed using token-level comparisons, statistical distance measures, or learned models that quantify semantic shift or off-topic behavior. Top K and K parameters may refer to the number of agents selected for a given operation, such as rebuttal routing or targeted re-query. K may be a configurable parameter stored in system configuration or in the agent-state tensor, and may be adapted at runtime.

user intervention may refer to any user initiated adjustment, nudge, or steering input that influences agent behavior, cognitive tendencies, conflict thresholds, or reasoning direction. This term does not require any particular mechanism.

wraparound/versioning rule may refer to any optional mechanism in which head_ptr or related counters include a paired epoch value or version tag that increments on wraparound to avoid counter reuse or ABA style anomalies. Examples include epoch counters, version tags, or other techniques. weighted aggregation may refer to any process that computes a weighted combination of agent embeddings or outputs.

weighted aggregator may refer to any mechanism that computes a weighted combination of agent embeddings or outputs. Examples include linear weighting, softmax normalized weighting, attention based weighting, mixture-of-experts gating, rule-based weighting, or any equivalent formulation that produces a synthesized vector or output.

Notation

The following symbols may refer to quantities used throughout this specification.

- alpha and beta may refer to routing weights for conflict and divergence and may be stored in the agent-state tensor.
- C_i may refer to the aggregated conflict score for agent i, with aggregation rules varying by embodiment.
- C_ij may refer to pairwise conflict-intensity, e.g., 1−cos (x_i, x_j).
- D_i may refer to the topic-divergence score for agent i.
- delta_t may refer to the delta update defined as s_t−s_{t−N}.
- epoch_counter_i may refer to a monotonic per-agent sequence-number and may be used for deterministic tie-breaking.
- epsilon may refer to a small positive constant for numerical stability, with example values such as 1e−8.
- eta may refer to an optional learning rate or nudging parameter.
- gamma may refer to an optional synthesis weighting parameter.
- head_ptr may refer to the circular buffer write index counter and may be updated atomically.
- lambda may refer to an optional decay or smoothing parameter.
- mu_t may refer to the rolling-mean similarity at time t, e.g., mu_t=sum_ptr/N.
- N may refer to the rolling-window size, with example values such as 8-64.
- norm_v_epsilon may refer to an epsilon-guarded norm defined as max(||v||, epsilon).
- p may refer to the input-signal embedding and may be computed once per dialogue cycle.
- priority_i may refer to the routing priority for agent i, e.g., alpha*C_i+beta*D_i.
- rolling_mean_ptr may refer to the published rolling-mean and may be written with release semantics.
- S may refer to the fixed point scale factor, with example values including 2^s.
- s_t may refer to the cosine similarity between v_t and p and may be defined using epsilon-guarded norms.
- s_{t−N} may refer to the outgoing similarity value read before overwrite.
- sum_ptr may refer to the running-sum of the last N similarity values and may be updated atomically.
- v_t may refer to the agent output embedding at time t and may be used in similarity computation.
- W may refer to the accumulator width in bits and may satisfy N*S<=2^(W−1)−1 in some embodiments.
- x_i may refer to the output embedding vector of agent i and may be stored in the agent-state tensor.

Atomic and Memory Ordering Primitives

The following terms may refer to platform-agnostic atomic operations, memory ordering constructs, and related primitives that may be used in some embodiments.

- acquire_release_memory_ordering may refer to any memory ordering semantics in which loads with acquire semantics synchronize with stores with release semantics to establish happens before relationships. In some embodiments, readers may use acquire loads and writers may use release stores, although other ordering mechanisms may be used.
- atomicCompareExchange may refer to any placeholder primitive representing an atomic compare and swap operation. It may compare a memory location to an expected value and, if equal, replace it with a new value. This primitive may be used for lock free coordination or deterministic updates. Equivalent primitives may be used.
- atomicExchAcquireReleaseIfAvailable may refer to any placeholder primitive representing an atomic exchange operation that uses acquire-release semantics when supported by the platform. If such semantics are not available, the primitive may fall back to a compare and swap loop, a designated-writer mechanism, or a host-coordinated publication barrier.
- atomicFetchAdd may refer to any placeholder primitive representing an atomic read-modify-write operation that adds a specified value to a memory location and returns the previous value. This primitive may be used for updating counters, pointers, or accumulators. Equivalent operations may be used.
- atomicLoadAcquireIfAvailable may refer to any placeholder primitive representing an atomic load that uses acquire semantics when supported. If acquire semantics are unavailable, the primitive may fall back to a platform specific safe load.
- atomicObserve may refer to any placeholder primitive representing a load operation that retrieves a value published by an atomicPublish style operation. It may be implemented using acquire semantics or any equivalent mechanism.
- atomicPublish may refer to any placeholder primitive representing a store operation that makes a value visible to other components or threads in a controlled manner. It may be implemented using release semantics or any equivalent publication mechanism.
- atomicReadModifyWrite may refer to any placeholder primitive representing an atomic operation that reads a value, applies a transformation, and writes the updated value back as a single indivisible action. This primitive may be used for updating rolling sums, deltas, or counters. Equivalent mechanisms may be used.
- atomicStoreRelease may refer to any placeholder primitive representing an atomic store that uses release semantics to publish a value. This ensures that prior writes become visible to readers performing acquire loads. Equivalent primitives may be used.
- fallbackAtomic may refer to any placeholder primitive representing a software based atomic emulation used when hardware atomics are unavailable. It may rely on locks, mutexes, or other synchronization constructs.
- memoryFenceAcquire may refer to any placeholder primitive representing a memory fence that enforces acquire ordering. It may ensure that subsequent reads are not reordered before the fence.
- memoryFenceRelease may refer to any placeholder primitive representing a memory fence that enforces release ordering. It may ensure that prior writes are not reordered after the fence.
- nonAtomicFastPath may refer to any placeholder primitive representing a non atomic code path used when exclusive access is guaranteed by design. This may provide performance benefits in single-threaded or single-writer contexts.
- platformAtomic may refer to any placeholder term describing platform provided atomic operations or intrinsics. Implementations may rely on hardware or compiler provided atomic primitives when available.

System Overview

The following overview provides a high-level description of certain system components and interactions. In some embodiments, the system may comprise a plurality of artificial-intelligence agents, each optionally configured with a cognitive-style parameter vector. A cognitive-style parameter vector may include numeric fields such as creativity bias, evidence weight, rebuttal_threshold, exploration_rate, or stability_factor, which may influence how an agent generates responses, evaluates evidence, or selects rebuttal targets. Agents may include analytical, creative, adversarial, summarization, or domain-specific agents. Each agent may receive a user-defined input-signal and may participate in structured dialogue cycles coordinated by a dialogue controller.

FIG. 1 illustrates an example system architecture 100 for adaptive multi-agent reasoning. The architecture includes a plurality of artificial intelligence agents 110*a*-110*n*, each associated with a cognitive-style profile 112 stored within an agent-state tensor 120. The agent-state tensor 120 further stores historical embeddings 122, drift indicators 124, and behavioral parameters 126. A dialogue controller 130 coordinates structured rebuttal cycles among the agents and communicates with a drift-detection module 140, which receives input-signal embeddings 142 and agent output embeddings 144. The drift-detection module 140 computes rolling-window similarity values stored in a drift vector buffer 146. A goal-alignment engine 150 computes coherence metrics 152, redundancy metrics 154, and evidence-consistency metrics 156, which are stored in a goal-alignment matrix 158. A conflict-weighted routing module 160 computes conflict-intensity 162 and topic-divergence 164, producing rebuttal targets 166 for the dialogue controller 130. A synthesis module 170 receives agent embeddings 172 and weighting coefficients 174 and generates a weighted aggregation 176 to produce a synthesized output 178. The system may operate on one or more processors 180, optionally including GPU or TPU acceleration 182 for embedding generation, similarity computation, and vectorized aggregation.

Figure 2:
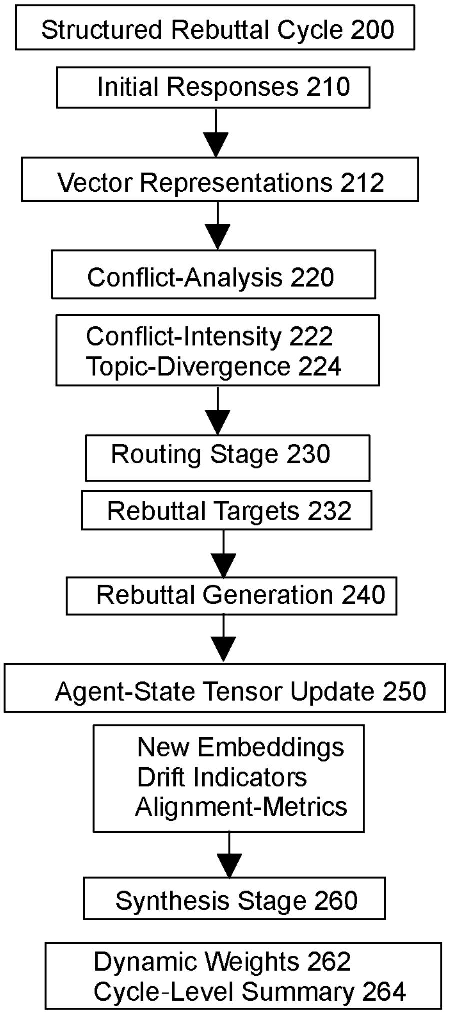
FIG. 2 is a data flow diagram of a structured rebuttal cycle.

FIG. 2 depicts a data-flow diagram 200 showing the sequence of operations during a structured rebuttal cycle. Agents generate initial responses 210, which are embedded into vector representations 212. A conflict-analysis stage 220 computes conflict-intensity 222 and topic-divergence 224. A routing stage 230 applies a conflict-weighted priority function to determine rebuttal targets 232. Agents generate rebuttals 240 directed at the selected targets. The dialogue controller updates the agent-state tensor 250 with new embeddings, drift indicators, and alignment-metrics. A synthesis stage 260 aggregates contributions using dynamic weights 262 to produce a cycle-level summary 264.

Figure 3:
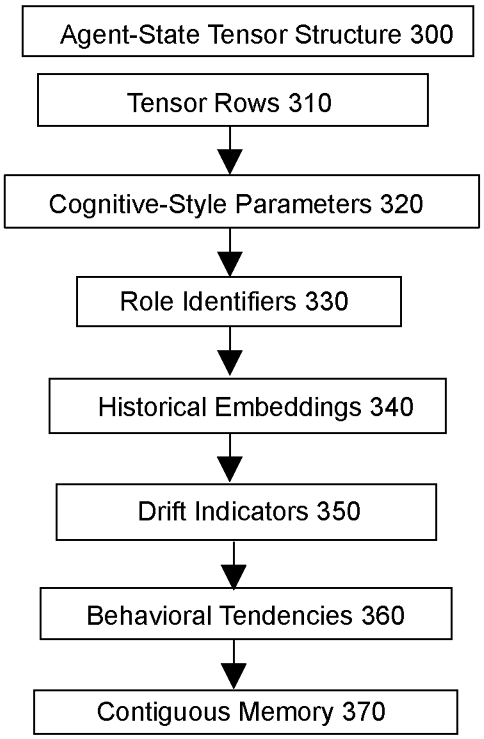
FIG. 3 is a diagram of an agent-state tensor structure.

FIG. 3 illustrates an agent-state tensor 300. Each row 310 corresponds to an agent, and each column block represents a parameter category, including cognitive-style parameters 320, role identifiers 330, historical embeddings 340, drift indicators 350, and behavioral tendencies 360. The tensor may be stored in contiguous memory 370, which may support favorable cache-access patterns and may facilitate vectorized execution on GPU hardware.

Figure 4:
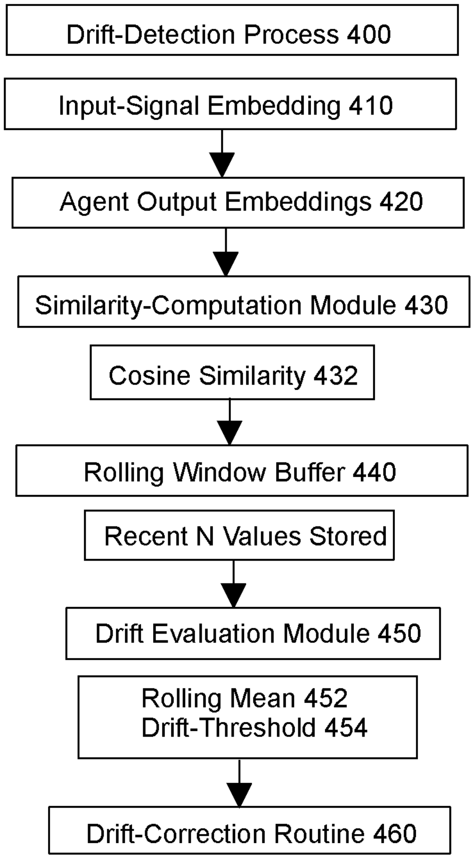
FIG. 4 is a diagram of a drift-detection process.

FIG. 4 shows a drift-detection process 400. An input-signal embedding 410 and agent output embeddings 420 are provided to a similarity-computation module 430, which computes cosine similarity values 432. A rolling-window buffer 440 stores the most recent N similarity values. A drift evaluation module 450 computes a rolling-mean 452 and compares it to a drift-threshold 454. When drift is detected, a drift-correction routine 460 adjusts agent parameters or reinitializes embeddings.

Figure 5:
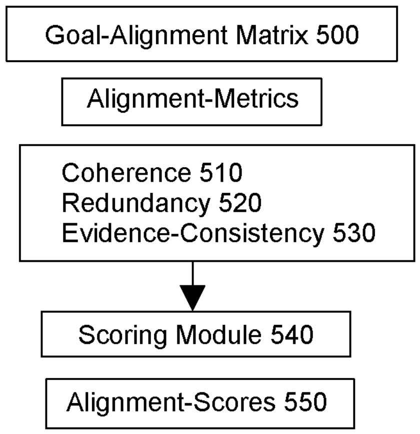
FIG. 5 is a diagram of a goal-alignment matrix.

FIG. 5 depicts a goal-alignment matrix 500. Rows correspond to agents, and columns correspond to alignment-metrics including coherence 510, redundancy 520, and evidence-consistency 530. A scoring module 540 computes alignment-scores 550 using weighted combinations of the metrics. These scores influence rebuttal routing and synthesis weighting.

Figure 6:
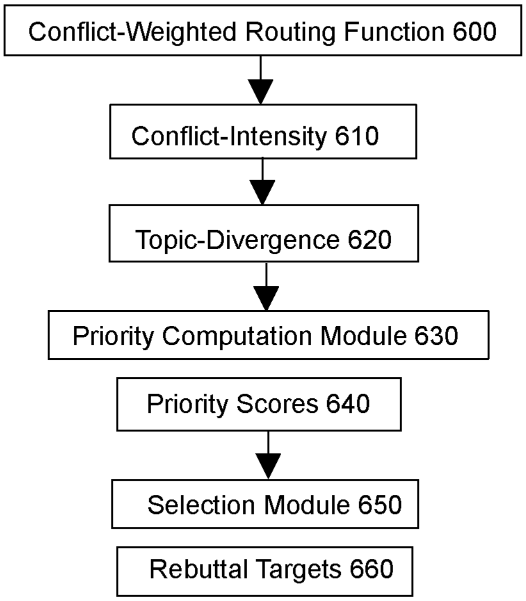
FIG. 6 is a diagram of a conflict-weighted routing function.

FIG. 6 illustrates a routing function 600 that computes conflict-intensity 610 and topic-divergence 620 for each agent pair. A priority computation module 630 applies a function to generate priority scores 640, and a selection module 650 identifies rebuttal targets 660.

Figure 7:
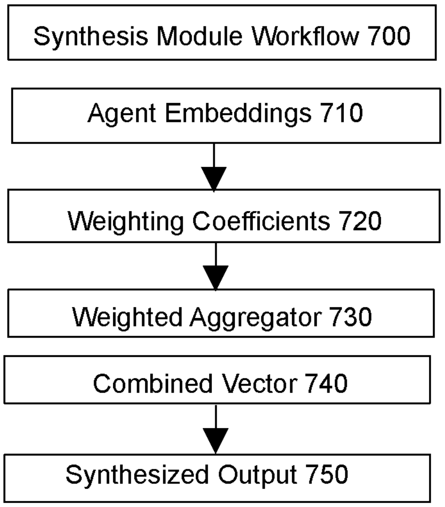
FIG. 7 is a diagram of a synthesis module workflow.

FIG. 7 shows a synthesis workflow 700. Agent embeddings 710 are combined with weighting coefficients 720 derived from conflict, drift, and alignment-metrics. A weighted aggregator 730 computes a combined vector 740, which is decoded into a synthesized output 750.

Figure 8:
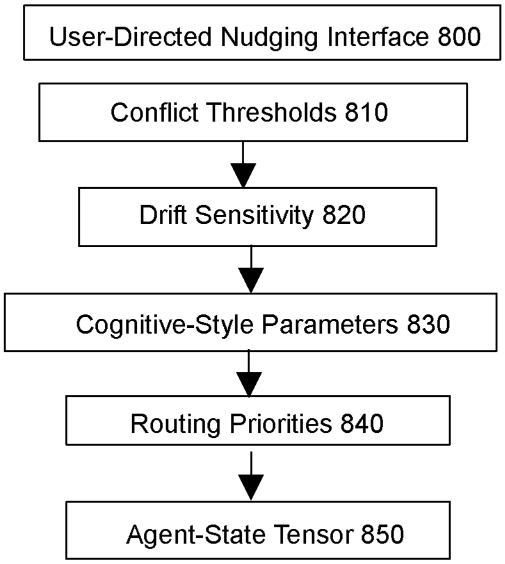
FIG. 8 is a diagram of a user-directed nudging interface.

FIG. 8 illustrates a user-directed nudging interface 800. A user may adjust conflict thresholds 810, drift sensitivity 820, cognitive-style parameters 830, or routing priorities 840. These adjustments update the agent-state tensor 850 and influence subsequent dialogue cycles.

General Implementation

In some embodiments, the system may include modules and data structures that implement portions of the functionality described herein. For example, the system may include a dialogue controller that coordinates structured rebuttal cycles and targeted response routing, a drift-detection module that monitors semantic divergence using similarity metrics, a goal-alignment engine that computes convergence metrics using coherence, redundancy, and evidence-consistency scores, and a synthesis module that generates refined insight or conflict-summaries using weighted aggregation. These modules may be realized as software components, device kernels, hardware-accelerated routines, or any equivalent implementation. The specification provides non-limiting examples of algorithms, data layouts, and platform mappings suitable for CPU, GPU, TPU, FPGA, or distributed environments. This embodiment may help address the problem of coordinating multi-agent reasoning in a stable, efficient, and deterministic manner across heterogeneous-hardware, and equivalent structures or modules may be used.

In some embodiments, the dialogue controller may implement rebuttal cycles by computing per-agent routing weights and selecting a subset of agents to generate rebuttals. For example, the controller may compute a conflict-related weight for each agent as a linear or nonlinear-combination of measurable features such as conflict-intensity and topic-divergence, store weights in an array such as agent_weights [M], and select top-K agents using a vectorized partial-selection routine. These mechanisms may help support efficient identification of agents most relevant for rebuttal generation under concurrent multi-agent workloads.

In some embodiments, the drift-detection module may compute cosine similarity or other vector-space metrics between agent outputs and an input-signal embedding. The module may maintain a drift-vector buffer implemented, for example, as a circular buffer of length N, along with a device-visible counter for indexing, a running-sum accumulator, and a published rolling-mean pointer. These structures may help support deterministic detection of semantic drift across heterogeneous-hardware.

In some embodiments, the goal-alignment engine may evaluate whether agents are converging toward a coherent insight by computing alignment-scores using weighted combinations of coherence, redundancy, and evidence-consistency metrics. For example, an alignment-score may be computed as a weighted combination of these metrics, and the resulting values may be stored in an array such as agent_alignment[M] for use in routing, selection, or synthesis routines. These techniques may help support evaluation of convergence or divergence during iterative multi-agent reasoning-cycles.

In some embodiments, the synthesis module may aggregate agent outputs using a weighted aggregator. For example, a synthesized vector may be computed as a weighted combination of agent-contribution vectors, where weights may be derived from conflict-intensity, drift status, alignment-metrics, user nudges, or other features, and may be normalized using softmax, temperature-scaling, or attention-style weighting. These aggregation techniques may help support generation of coherent, non-redundant insight from multiple agent contributions.

In some embodiments, user-directed nudging may be implemented by exposing tunable-parameters stored in the agent-state tensor. For example, a user nudge may adjust parameters that influence conflict weighting, selection scoring, embedding correction, or contribution reweighting, and these adjustments may be recorded so that subsequent controller cycles observe updated values. Such nudging mechanisms may help support real-time user steering of multi-agent behavior without interrupting ongoing reasoning.

In some embodiments, storing per-agent parameters and embeddings in a contiguous agent-state tensor may support vectorized similarity and aggregation operations. For example, the tensor may be stored in row-major contiguous memory with each embedding occupying D consecutive values, optionally with alignment or padding to support favorable memory-access patterns, allowing a device kernel to compute dot-products for multiple agents in parallel. This layout may help support coherent memory behavior and may be associated with reduced redundant computation in large-scale multi-agent systems.

In some embodiments, the system may implement conflict-weighted routing, agent selection, drift-correction, and synthesis using explicit formulas and named data structures. For example, routing may be implemented by computing agent_weights[M] as a transform of measurable features, selection may be implemented using partial quickselect or radix-selection, and drift-correction may use convex-combination updates or multiplicative-weight adjustments. These explicit formulations may help support clear and efficient multi-agent coordination.

In some embodiments, numerical-stability guards may be applied to vector-similarity computations. For example, cosine similarity may be computed using an epsilon-guarded norm such as denom=max(norm(e_i)*norm(e_input), epsilon), with epsilon set to a small positive constant. These stability mechanisms may help support numerical stability in high-dimensional or quantized embedding-spaces.

Numerical Stability and Epsilon-Guarded Norms

The following paragraphs describe optional techniques for enabling stable similarity computation. In some embodiments, numerical stability may be maintained through epsilon-guarded normalization to avoid division by zero, extreme scaling, or numerical instability, with the denominator computed as max(norm(a)*norm(b), epsilon). These techniques may help support stable similarity computation when vectors have small norms or are quantized.

In some embodiments, fixed-point or quantized implementations may scale embeddings by a factor 2^s, perform integer dot-products and integer-norm products, and rescale results to floating-point. Overflow or underflow may be mitigated by selecting s such that intermediate integer products remain within representable ranges, with norms optionally precomputed in floating-point. These approaches may help support efficient similarity computation on constrained or quantized hardware.

Deterministic Atomic Indexing and Distributed Corrective Actions

In some embodiments, deterministic atomic indexing and rolling-mean updates may be implemented using device-visible atomic primitives that return prior values and provide acquire-release ordering when supported. For example, a device fetch-and-add on head_ptr may return a prior counter value that may be reduced modulo N to obtain a write index, with CPU CAS-loop mappings, FPGA arbitration mappings, TPU/XLA AtomicRMW mappings, and host-coordinated block-allocation mappings provided as examples. These mechanisms may help support deterministic buffer updates and consistent drift statistics across heterogeneous devices.

In some embodiments, corrective actions triggered by drift-detection may be logged with Lamport timestamps or vector clocks to support deterministic reconciliation in distributed environments. For example, each corrective event appended to a correction log may include an agent identifier, an action type, and a logical timestamp, allowing a coordinator to merge events deterministically. These techniques may help support consistent reconciliation of corrective-action history across distributed or asynchronous multi-agent systems.

Representative Technical Characteristics

Certain embodiments may employ a deterministic execution model that associates high-level multi-agent orchestration with ordered device-level operations. For example, a contiguous agent-state tensor may support coalesced memory access; a fused kernel may perform parallel similarity evaluation; deterministic circular-buffer indexing using fetch-and-add operations may preserve temporal ordering; and atomic delta updates followed by publish-then-overwrite sequences may maintain correctness of rolling-window statistics under concurrent updates. These mechanisms may help support stable and reproducible multi-agent behavior under parallel execution.

In some embodiments, priority scores and alignment-scores may be computed using explicit linear or nonlinear transforms that take agent embeddings, input embeddings, and context features as inputs. For example, a priority score may be computed using a function such as softplus($u^T$[e_i; e_input; c_i]), where [e_i; e_input; c_i] denotes vector concatenation and u is a learned or configured weight vector. These transforms may help support deterministic, hardware-accelerated routing and stable synthesis weighting.

In some embodiments, selection and ranking operations may be implemented using explicit algorithms. For example, top-K selection may be implemented using partial quickselect or radix-selection routines, and deterministic tie-breaking using stored agent priorities or sequence counters may support reproducible ordering. These techniques may help support consistent agent selection under concurrent workloads.

In some embodiments, the synthesis module may support multiple aggregation strategies that operate on the agent-state tensor. For example, the module may compute weighted sums of content-vectors, apply attention-style reweighting, or compute conflict-summaries by aggregating contradiction scores. These strategies may help support coherent aggregation and may be associated with reduced redundant memory traversal during GPU or TPU execution.

In some embodiments, user-directed nudging may be implemented by exposing tunable-parameters stored in the agent-state tensor. For example, a nudge that adjusts a parameter such as alpha may be written into the agent-state tensor and observed by subsequent device kernels, and in distributed embodiments, nudges may be assigned logical timestamps and merged deterministically. These mechanisms may help support real-time user influence over multi-agent behavior while maintaining deterministic execution.

In some embodiments, the goal-alignment engine may evaluate whether agents are converging toward a coherent insight by computing alignment-scores using weighted combinations of coherence, redundancy, and evidence-consistency metrics. These scores may influence routing, selection, or synthesis operations. These techniques may help support evaluation of convergence or divergence during iterative multi-agent reasoning.

In some embodiments, the synthesis module may aggregate agent outputs using weighted combinations of content-vectors, conflict-summaries, or alignment-scores. For example, a synthesized vector may be computed as a weighted sum of agent-contribution vectors, where weights may be derived from conflict-intensity, drift status, alignment-metrics, or other features, and may be normalized or filtered using thresholding-or-sparsification. These mechanisms may help support generation of coherent aggregated insight from multiple agent contributions.

In some embodiments, user-directed nudging may allow users to adjust agent behavior, conflict thresholds, or cognitive tendencies during the reasoning process. Nudges may modify parameters within the agent-state tensor, influence routing priorities, or alter synthesis weighting. These techniques may help support interactive, user-guided adaptation of multi-agent reasoning systems.

In some embodiments, storing per-agent parameters and embeddings in a contiguous agent-state tensor may support vectorized similarity and aggregation operations. For example, a single GPU kernel may compute dot-products for multiple agent embeddings in parallel and write similarity values into a drift-vector buffer. This linkage may help support coherent computation and may be associated with reduced redundant processing.

In some embodiments, the system may exhibit characteristics such as reduced recomputation overhead, favorable memory-access patterns, consistent similarity computations, and stable convergence behavior. These characteristics may arise from ordered combinations of data structures and device-level operations, although alternative combinations may exhibit similar properties. These mechanisms may help support scalable multi-agent reasoning across diverse hardware platforms.

Technical Characteristics of the Disclosed Architecture

Certain embodiments may employ a deterministic execution model that associates multi-agent orchestration with ordered device-level operations. In some embodiments, the system may store agent embeddings, scores, drift values, and routing signals in a contiguous agent-state tensor and may evaluate similarity, drift, and routing functions within a hardware-accelerated kernel. Platform-appropriate atomic operations, including compare-and-swap and fixed-point accumulation techniques, may support consistent write ordering across CPU, GPU, FPGA, or other heterogeneous devices. These mechanisms may be associated with reduced kernel-interaction overhead, favorable memory-access characteristics, and predictable update behavior during multi-agent execution.

Operational Interactions within the Disclosed Architecture

Certain embodiments may employ combinations of data structures, similarity metrics, and update procedures that operate together within a deterministic execution model. For example, a contiguous agent-state tensor may support coalesced memory access; a fused kernel may perform parallel dot-product computation; deterministic fetch-and-add indexing together with a read-before-write circular buffer may preserve temporal ordering of similarity samples; and atomic delta updates followed by publish-then-overwrite sequences may maintain correctness of rolling-window statistics under concurrent updates. These interacting design choices may help address technical considerations such as mitigating race conditions, avoiding redundant computation, and supporting reproducible visibility across devices.

The embodiments described herein may relate to systems and methods for adaptive multi-agent reasoning using structured dialogue, drift-monitoring techniques, conflict-weighted routing, goal-alignment scoring, and synthesis weighting. Some embodiments may employ data structures, vector-space operations, or hardware-accelerated computations to support coherence, stability, or computational characteristics. Examples include contiguous agent-state tensors, fused similarity kernels, circular-buffer indexing, and deterministic update procedures. These mechanisms may help address technical considerations associated with scalable and stable multi-agent reasoning across heterogeneous-hardware environments.

In some embodiments, the system may comprise a plurality of artificial-intelligence agents, each optionally configured with a cognitive-style parameter vector. A cognitive-style parameter vector may include numeric fields such as creativity bias, evidence weight, rebuttal_threshold, exploration_rate, or stability_factor, which may influence how an agent generates responses, evaluates evidence, or selects rebuttal targets. Agents may include analytical, creative, adversarial, summarization, or domain-specific agents. Each agent may receive a user-defined input-signal and may participate in structured dialogue cycles coordinated by a dialogue controller.

The system may maintain several data structures, including an agent-state tensor, a drift-vector buffer, a goal-alignment matrix, and a dialogue-turn graph. These structures may support storage, retrieval, and manipulation of agent-related information across dialogue cycles. In some embodiments, the agent-state tensor may be stored in contiguous memory, which may support favorable cache-access patterns, coalesced memory reads, or reduced redundant recomputation during vectorized similarity computation. These structures may help support high-throughput access patterns during multi-agent processing.

The system may operate on one or more processors, optionally including GPU or TPU acceleration for embedding generation, similarity computation, or vectorized aggregation. Storing agent parameters and embeddings in a contiguous tensor may support single-kernel similarity computations across agents, which may be associated with reduced kernel-launch overhead and favorable hardware-utilization characteristics. In some embodiments, a single kernel may update a circular drift buffer using a device-side counter, a running-sum accumulator, and a published rolling-mean pointer, with platform-appropriate atomic semantics and memory-ordering guarantees. These mechanisms may help support consolidation of similarity computation, drift-buffer updates, and rolling-mean publication into a single pass, which may reduce memory traversal and avoid repeated reloading of embeddings.

Single-Kernel Pseudocode and Ordering Invariant

This subsection describes approaches for implementing a single-kernel update path and an associated ordering behavior. The following pseudocode presents one representative ordered sequence of operations that may be executed within a device kernel.

In some embodiments, a single device kernel may process agent embeddings in parallel and may maintain an ordering behavior in which a running-sum reflects the most recent N similarity values stored in a drift-vector buffer. An illustrative thread-level sequence may include:

```
outgoing=drift_buffer[write_index]// read old slot
new_sim=dot(agent_embedding[tid], input emb)
delta=new_sim−outgoing
atomic_add(&running_sum, delta) // or CAS loop
rolling_mean=running_sum/N
drift_buffer[write_index]=new_sim
// memory fence if required by platform
```

An illustrative correctness argument is that a read-before-write pattern combined with atomic delta application may help ensure that updates are applied without loss and that a running-sum reflects a rolling-window of recent values. This ordered sequence may help support reproducible drift statistics under concurrent execution. By performing these operations within a single kernel, some embodiments may reduce synchronization overhead and memory traffic. A worked numeric example (for example, N=4 with concurrent writers) may be included to illustrate possible interleavings. Equivalent implementations are contemplated.

Agent-State Tensor

The agent-state tensor may refer to a multidimensional data structure that stores per-agent attributes such as cognitive-style parameters, role identifiers, historical embeddings, drift indicators, conflict-intensity scores, alignment-metrics, and behavioral tendencies. These values may be updated across dialogue cycles and may support similarity computation, drift-detection, routing, and synthesis. In some embodiments, the agent-state tensor may include arrays such as agent_embeddings[M][D], agent_norms[M], agent_weights[M], agent scores[M], and agent_alignment[M] to support vectorized computation. These structures may help support high-throughput access to agent-specific data during multi-agent reasoning.

In some embodiments, the agent-state tensor may be represented as a matrix of size M by D, where M is the number of agents and D is the dimensionality of the combined parameter vector. Each row may correspond to the parameterization of an agent, including static traits and dynamic state variables. Auxiliary fields such as per-agent norms, conflict-history, or alignment-score traces may also be included. Platform-specific mappings for deterministic fetch-and-add semantics (for example, CPU compare-and-swap loops, FPGA monotonic counters, TPU/XLA AtomicRMW operations, or host-coordinated multi-GPU counters) may be used. These mechanisms may help support deterministic updates across heterogeneous-hardware.

The agent-state tensor may be stored in contiguous row-major memory, which may support favorable cache-access patterns and coalesced reads during GPU execution. In some embodiments, the tensor may be aligned to 128-byte or 256-byte boundaries, and padding may be inserted to align each agent's embedding vector. Per-agent norms may be stored in a parallel array such as agent_norms[M] to avoid recomputation, and the input-signal embedding norm may be computed once per dialogue cycle and reused. These techniques may help support reduced redundant computation and favorable memory-access behavior.

Drift-buffer updates may follow a deterministic circular-buffer and atomic-update behavior. This behavior may help support reproducible ordering of similarity updates and may help ensure that a running-sum reflects recent values. In long-running embodiments, a 64-bit counter or a quiescent-reset procedure may be used to mitigate counter wrap-around, and host-synchronization after kernel completion may support visibility of device-side writes. These mechanisms may help support consistent rolling-window statistics under concurrent updates.

GPU Kernel Execution and Contiguous Tensor Access

In some embodiments, high-throughput similarity computation and drift tracking may be supported by a hardware-accelerated kernel that operates on a contiguous agent-state tensor. The tensor may be stored in row-major contiguous memory, with each agent embedding occupying D consecutive 32-bit values. Rows may optionally be aligned to 128-byte or 256-byte boundaries to support coalesced memory transactions on GPU, TPU, or other vectorized architectures. Padding may be inserted to maintain alignment. A parallel array such as agent_norms[M] may store precomputed norms to avoid redundant computation, and the input-signal embedding norm may be computed once per dialogue cycle and reused. These mechanisms may help support favorable use of memory-bandwidth during similarity computation.

Atomic memory ordering, visibility guarantees, and cross-platform semantics may follow a canonical ordering behavior. Equivalent semantics may be implemented on CPU, FPGA, TPU, or multi-GPU systems. These mechanisms may help support consistent update visibility across heterogeneous compute environments.

Deterministic Atomic Circular Buffer Indexing

In some embodiments, a drift-vector buffer may be implemented as a circular buffer of length N. A device-visible counter such as head_ptr may serve as a monotonically increasing write counter. An update may obtain a write position using an atomic fetch-and-add primitive, for example:

```
prior=atomicAdd(head_ptr, 1ULL);
write_index=prior % N;
```

This approach may provide unique indices, ordered-update behavior, and platform-agnostic reproducibility. These mechanisms may help support deterministic indexing under concurrent writes.

Platform-Specific Implementations (a) CPU (x86/ARM) Implementation with Memory-Ordering Guarantees A CPU implementation may emulate fetch-and-add semantics using a CAS loop, for example:

```
uint64_t prior, next;
do {
  prior=atomic_load_explicit(head_ptr, memory_order_acquire);
  next=prior+1;
} while (!atomic_compare_exchange_strong_explicit(
  head_ptr, &prior, next,
  memory_order_acq_rel, memory_order_acquire));
write_index=prior % N;
```

Acquire-release semantics may be used to avoid spurious failures. If counter reuse is possible, optional ABA-mitigation techniques such as version tagging or epoch counters may be used. These mechanisms may help support correct counter progression under concurrent updates.

(b) FPGA Implementation (Arbitration and Latency)

An FPGA implementation may use a monotonic hardware counter, an incrementer, an arbitration unit, and a handshake protocol that returns the prior counter state. Implementations may document arbitration latency or backpressure behavior. Long-running counters may use quiescent resets or wrap-around-safe widths. These mechanisms may help support deterministic indexing in pipelined hardware environments.

(c) TPU/XLA Implementation

TPU/XLA may provide AtomicRMW operations with fetch-and-add semantics, for example:

xla::AtomicRMW(head_ptr, +1, xla::AtomicOpType::kAdd);

Acquire-release ordering may be enforced through XLA memory-ordering constraints. These mechanisms may help support consistent update visibility across TPU execution replicas.

(d) Multi-GPU/Distributed Implementation (Persistence and Recovery)

In some embodiments, a host-coordinated monotonic counter may support global determinism. A device may request a block of indices; the host may increment a global counter and return a starting offset; devices may perform local fetch-and-add operations within the assigned block. Persistence mechanisms such as stable-storage checkpoints or epoch markers may be used to support recovery. These mechanisms may help support deterministic indexing across distributed devices.

Drift-Detection Module—Deterministic Rolling-Window Similarity Tracking

In some embodiments, drift-detection may be implemented by maintaining a rolling-window of similarity values between agent outputs and an input-signal embedding. Let $s_t$ denote a similarity value computed using cosine similarity or another metric. The drift-detection module may store the most recent N values in a circular buffer indexed by a device-visible counter, for example:

write_index=head_ptr % N;

A device-side running-sum may store the arithmetic sum of the last N values, and a published rolling-mean may provide low-latency access for readers. A drift-threshold may determine when corrective actions are triggered. These mechanisms may help support reliable detection of semantic drift under concurrent update patterns.

Similarity Computation

In some embodiments, each similarity value $s_t$ may be computed using an epsilon-guarded cosine similarity to support numerical stability across floating-point and fixed-point platforms. An illustrative formulation is:

sim(*e*_*i*,*e*_input)=(*e*_*i***e*_input)/max(norm(*e*_*i*)*norm(*e*_input),epsilon)

where epsilon may be a small positive constant (for example, 1e-8). The epsilon-guard may help prevent division by zero and may suppress extreme scaling when either embedding has a small norm. Embeddings may be stored in 32-bit floating-point or fixed-point formats depending on platform capabilities. The guarded denominator may help support well-defined and consistent similarity values across heterogeneous devices.

Deterministic Update-Ordering

This description provides one example of how deterministic update-ordering may be maintained during concurrent rolling-mean updates. This approach may help support reproducible drift-detection under unordered memory-visibility conditions and may support consistent behavior across heterogeneous devices. In one example, an outgoing similarity value may be read before a buffer slot is overwritten:

old=drift_buffer[write_index];

A delta may then be computed:

delta=s_t−old;

A running-sum may be updated using an atomic read-modify-write operation:

prior_sum=atomicAdd_system_scope(sum_ptr, delta);

After the atomic update, a rolling-mean may be computed and published:

new_mean=(prior_sum+delta)/N;

store_system_release(rolling_mean_ptr, new_mean);

The buffer slot may then be overwritten:

drift_buffer[write_index]=s_t;

A system-scope visibility fence may be issued:

_threadfence_system( );

This fence may help support visibility of prior writes to readers performing acquire-ordered loads. Equivalent mechanisms may be used.

Correctness Invariant

In some embodiments, if the buffer contains the last N similarity values s_{t−N+1} . . . s_t, an implementation may maintain the invariant:

sum_ptr=sum of the last N similarity values

This behavior may arise because the outgoing value is read before overwrite, the running-sum is updated using an atomic read-modify-write, the rolling-mean is published after the atomic update, and the buffer slot is overwritten afterward.

Rolling-Mean Correctness Invariant and Proof Sketch

An illustrative invariant is that, under an ordered-update sequence, (1) acquire an ordered read of the outgoing slot, (2) perform the atomic delta update, (3) publish the rolling-mean with release ordering, and (4) overwrite the buffer slot. A reader performing an acquire-ordered load after publication may observe a rolling-mean corresponding to the most recent N similarity values.

A proof sketch may proceed as follows. Let the deterministic write sequence be indexed by t=1, 2, . . . , and let the buffer hold the last N values. Each writer may perform: read outgoing slot, compute delta, perform an atomic update, publish the rolling-mean, and overwrite the slot. Because the atomic update serializes contributions to the running-sum, the sum may reflect the most recent N values. Cross-device visibility may be supported using a system fence or host-synchronization. If a platform lacks acquire-release primitives, alternative embodiments such as a designated-writer or a host-coordinated epoch barrier may be used.

Worked Rolling-Window Example (N=3)

The following example illustrates one possible rolling-window update sequence for N=3.

Suppose:

drift buffer=[0.10, 0.20, 0.30]

sum_ptr=0.60

Assume New Similarity Values:

s1=0.40 s2=0.25 s3=0.50

Each Update May Use:

delta=s_new−s_old

Step 1 write_index=0 old=0.10 delta=0.30 sum_ptr=0.90 mean=0.30 drift_buffer=[0.40, 0.20, 0.30]

Step 2 write index=1
old=0.20
delta=0.05
sum_ptr=0.95
mean=0.316666 . . . .
drift_buffer=[0.40, 0.25, 0.30]

Step 3 write_index=2
old=0.30
delta=0.20
sum_ptr=1.15
mean=0.383333 . . .
drift_buffer=[0.40, 0.25, 0.50]

This example illustrates how a read-before-write pattern, atomic delta updates, and deterministic indexing may preserve a rolling-window invariant under concurrent updates.

Exponential Moving-Average Drift Metric

In some embodiments, the drift statistic may be computed using an exponential moving average with a smoothing factor lambda to provide a decayed-weight temporal estimate. This approach may help support reduced sensitivity to short-term fluctuations in noisy or rapidly evolving dialogue contexts. Integrating EMA-based drift-detection into a deterministic update-pipeline may help support stable long-term drift estimation while maintaining reproducible ordering across hardware.

Distributed Deterministic-Merge (Multi-Node Embodiments)

In distributed embodiments, each node may maintain a local rolling-window and local running-sum. Updates may be tagged with Lamport timestamps or vector clocks, and nodes may send (delta, timestamp) pairs to a coordinator, which may merge updates in deterministic timestamp order. This merge procedure may help support a global rolling-mean that reflects a logical update sequence consistent with single-device execution. Epoch markers or durable checkpoints may be used to support recovery.

Atomic Semantics Alternatives

Platforms lacking native floating-point atomic operations may emulate equivalent semantics using one or more of the following techniques. These alternatives may help support deterministic update-ordering and rolling-window behavior across CPU, GPU, FPGA, TPU, and distributed environments.

1. CAS Loop (Atomic Read-Modify-Write)

```
do {
    cur=atomic_read(running_sum_fp);
    cand=cur+delta;
} while (!CAS(&running_sum_fp, cur, cand));
```

2. Fixed-Point Scaling

```
scaled_delta=round((s_t−old)*S);
atomic_add_int(&running_sum_int, scaled_delta);
rolling_mean=running_sum_int/(N*S);
```

3. Designated Writer Thread

A designated-writer may apply updates sequentially after worker threads enqueue deltas.

4. Atomic Exchange Publication

```
atomicExch(rolling_mean_ptr, new_mean);
```

Equivalent constructs such as CAS loops, epoch markers, or host-coordinated barriers may be used.

Fixed-Point Accumulator Embodiment

In some embodiments, similarity values may be converted to fixed-point integers using a scaling factor S=2^s. For example:

```
sim_fp=(int64_t)(sim*S);
old_fp=(int64_t)(old*S);
delta_fp=sim_fp−old_fp;
prior_fp=atomic_fetch_add(&sum_fp, delta_fp);
mean=(float)(prior_fp+delta_fp)/(float)(S*N);
```

The accumulator width W may be selected to avoid overflow for the chosen window size N and scaling factor S. Illustrative values include W=64-bits and S=2^24. Other widths and scaling factors may be used. This approach may help support deterministic rolling-window updates on platforms without floating-point atomic operations.

Corrective Actions

When a rolling-mean falls below a drift-threshold, the system may adjust agent weights, apply embedding corrections, trigger realignment cycles, modify routing priorities, or apply user-directed nudges. Corrective actions may be logged with Lamport timestamps to support deterministic reconciliation in distributed embodiments. These mechanisms may help support consistent corrective-action history across devices.

Visibility of rolling_mean_ptr rolling_mean_ptr may be updated by a designated thread or written atomically using acquire-release semantics. Readers may perform acquire-ordered loads to observe a consistent rolling-mean. Host-side synchronization may be used when strong cross-device consistency is required. In multi-device embodiments, readers may consult persisted epoch markers or coordinator-mediated barriers. An illustrative sequence is:

```
old=drift_buffer[write_index];
delta=sim−old;
prior_sum=atomicAdd(sum_ptr, delta);
new_mean=(prior_sum+delta)/N;
atomicExchAcquireReleaseIfAvailable(rolling-
    _mean_ptr, new_mean);
drift_buffer[write_index]=sim;
threadfence_systemo;
```

These mechanisms may help support consistent publication and visibility of rolling-mean updates.

Atomic Float Portability Mapping

On platforms without native floating-point atomic operations, equivalent semantics may be implemented using one or more of the following mappings:

(a) Fixed-Point Representation

```
scaled_delta=round((s_t−old)*S);
atomic_add_int(&running_sum_int, scaled_delta);
rolling_mean=running_sum_int/(N*S);
```

(b) Acquire-Release CAS Loop

A CAS loop may emulate atomic read-modify-write semantics on floating-point bit patterns.

(c) Designated Writer Thread

A single-writer may serialize updates while readers use acquire loads or host-synchronization. These mappings may help support deterministic update-ordering and rolling-window behavior across heterogeneous-hardware.

Define Helper Placeholders atomicLoadAcquireIfAvailable and atomicExchAcquireReleaseIfAvailable may refer to helper placeholders used in pseudocode to indicate acquire-ordered atomic loads and acquire-release atomic exchanges. These placeholders abstract platform differences while supporting memory-ordering behavior useful for deterministic drift tracking. On platforms lacking such primitives, equivalent constructs such as CAS-based loops, designated-writer threads, or host-coordinated publication with epoch markers may be used.

Performance Guidance and Disclaimers

In some embodiments, single-kernel aggregation may be appropriate when values of M and D produce high device occupancy or when kernel-launch overhead is significant. Multi-kernel fallbacks may be used for large M or constrained device memory. Implementations may profile kernel occupancy and memory traffic to select an appropriate execution strategy. Performance descriptions describe expected behavior under certain hardware and workload conditions and are not intended to imply that specific empirical tests were performed.

Designated Writer Semantics

In some embodiments, platforms lacking acquire-release atomic primitives for floating-point operations may publish an updated rolling-mean using a designated-writer. A designated-writer may be a thread, warp, block, device, or host component responsible for performing the publication step after an atomic or serialized update to the running-sum. The designated-writer may perform a release-ordered store of a sequence-number and the computed mean, and readers may perform acquire-ordered loads to observe consistent values.

In some embodiments, worker threads may compute deltas and enqueue them into a lock-free queue, and a designated-writer may drain the queue and apply updates sequentially. An illustrative sequence may include: reading an outgoing value, computing a delta, updating the running-sum, publishing the rolling-mean with release semantics, and overwriting the buffer slot. Equivalent embodiments may use sequence counters, epoch markers, or host-coordinated publication to support ordering and visibility guarantees.

Atomic Exchange Publication-Semantics

In some embodiments, an updated rolling-mean may be published using an atomic exchange operation that provides acquire-release semantics. For example:

atomicExch(rolling_mean_ptr, mu_t);

on CUDA-class devices, or std::atomic_exchange with acquire-release ordering on CPU platforms. This approach may help support serialized publication behavior and may help support visibility of prior writes. Platforms lacking native acquire-release atomic exchange may emulate equivalent semantics using CAS loops, designated-writers, or host-coordinated publication barriers.

Deterministic update-ordering, running-sum behavior, and rolling-mean publication-semantics may be implemented using the canonical invariant described in the drift-buffer and rolling-window embodiments. These mechanisms may help support reproducible update sequencing and consistent propagation of writes across heterogeneous execution environments.

Single-Kernel Similarity Computation (Pseudocode)

The following pseudocode illustrates one non-limiting embodiment of a single-kernel similarity computation that may incorporate numerical-stability guards, deterministic circular-buffer indexing, atomic rolling-mean updates, read-before-write ordering, and platform-portable atomic semantics. Alternative embodiments may use warp-level primitives, multi-kernel pipelines, or CPU/FPGA implementations.

```
// Device kernel (CUDA-style pseudocode; semantics described below)
_global_void compute_similarities(
    const float*agent embeddings,
    const float*input signal_embedding,
    const float*agent_norms,
    float input signal_norm,
    float*drift buffer,
    unsigned long long*head_ptr,
    float*sum_ptr,
    float*rolling_mean_ptr,
    int M,
    int D,
    int N)
{
    int idx=blockIdx.x*blockDim.x+threadIdx.x;
    if (idx>=M) return;
    float dot=0.0f,
    int base=idx*D;
    for (int k=0; k<D; ++k) {
      dot+=agent_embeddings[base+k]*input signal_embedding[k]
    }
    const float eps=1e-8f,
    float denom=fmaxf(agent_norms[idx]*input_signal_norm, eps);
    float sim=dot/denom;
    unsigned long long prior=atomicAdd(head_ptr, 1ULL);
    int write_index=(int)(prior % (unsigned long long)N);
    float old=atomicLoadAcquireIfAvailable(&drift buffer[write_index]);
    float delta=sim-old;
    float prior_sum=atomicAdd(sum_ptr, delta);
    float new_mean=(prior_sum+delta)/(float)N;
    atomicExchAcquireReleaseIfAvailable(rolling_mean_ptr, new_mean);
    drift buffer[write_index]=sim;
    _threadfence_systemo;
}
```

Notes on Portability and Semantics

Atomic fetch-and-add semantics may require that atomicAdd(head_ptr, 1ULL) return the prior value and provide acquire-release ordering on platforms that support such ordering. Equivalent platform mappings may include CPU CAS loops, FPGA monotonic counters, TPU/XLA AtomicRMW, or host-coordinated block-allocation. Reading the outgoing value may use an acquire-ordered atomic load where available; if unavailable, a plain load may be used in combination with subsequent atomic updates and device or system fences to help support ordering and visibility guarantees. These examples are illustrative.

Atomic Update and Publication-Semantics

In some embodiments, the update to sum_ptr may be performed atomically and may use acquire-release semantics to support a running-sum behavior under concurrency. An atomic operation may return the prior sum value. Publication of a new rolling-mean may use an atomic exchange with acquire-release semantics so that readers performing acquire-ordered loads may observe a consistent value. On platforms lacking such primitives, equivalent mechanisms such as a designated-writer, CAS-based loops, or host-coordinated publication may be used. These examples are illustrative.

An illustrative ordered sequence may include: reading the outgoing value before computing a delta, performing an atomic update to sum_ptr, publishing the new mean, and then overwriting drift buffer[write_index]. A device- or system-scope fence (for example, _threadfence_systemo) may be used to help support visibility to other devices or the host. Host readers may perform a synchronization step (for example, cudaDeviceSynchronize( ) or an equivalent barrier) before reading device memory. The epsilon-guard is illustrative; implementations may choose alternative constants or adaptive guards. This single-kernel approach is illustrative and non-limiting; multi-kernel pipelines, warp-level reductions, tiled dot-product kernels, or CPU/FPGA/ASIC vector engines may also be used.

Memory Fence and Host-Synchronization Semantics

Memory-fence operations may help support visibility of writes across thread blocks and devices. Illustrative examples include device-level fences such as _threadfence( ) or OpenCL mem_fence, system-wide fences such as _threadfence_system( ), and host-side synchronization mechanisms such as cudaDeviceSynchronize( ). When the host reads drift_buffer, sum_ptr, or rolling_mean_ptr, a full device synchronization may be performed after kernel completion to help support visibility of device writes.

The specification contemplates platform-appropriate fence and synchronization primitives; the examples above are illustrative. In some embodiments, sum_ptr may be initialized on the host to the arithmetic sum of the initial N buffer values (for example, sum_ptr=mu_0*N) prior to kernel launch. Helper placeholders used in pseudocode, such as atomicLoadAcquireIfAvailable and atomicExchAcquireReleaseIfAvailable, may map to CAS-based loops, designated-writer semantics, or platform-specific atomic primitives where native primitives are unavailable.

Readers that require a consistent rolling-mean may perform an acquire-ordered load of rolling_mean_ptr. Host readers may perform host-side synchronization after kernel completion to help support system-wide visibility. In multi-device embodiments, readers may consult persisted epoch markers or coordinator-mediated barriers when global consistency is required. These examples are illustrative.

Illustrative Performance Characteristics

Consolidating similarity computation, circular-buffer indexing, and rolling-sum updates into a single kernel may be associated with reduced kernel-interaction overhead relative to multi-stage pipelines. This consolidation may be associated with favorable memory-access behavior by reducing intermediate global-memory writes and may help support reduced synchronization overhead. The magnitude of any performance characteristics may depend on hardware configuration, embedding dimensionality, agent count, rolling-window size, and implementation details. Performance statements are qualitative and illustrative only.

A synthetic microbenchmark described in one embodiment may compare a single-kernel configuration with a multi-kernel configuration. Reported results may illustrate relative kernel-interaction behavior or memory-bandwidth utilization. These examples are illustrative.

Illustrative Benchmark Table

The table below provides representative performance characteristics for one possible implementation of a single-kernel similarity and rolling-mean update configuration. These values may vary based on hardware configuration and are provided solely as qualitative guidance. The comparison may illustrate potential technical effects associated with consolidating similarity computation and rolling-mean updates into a single kernel, such as reduced kernel-interaction overhead, favorable memory-access behavior, or reduced global-memory traversal relative to multi-stage pipelines. No empirical testing is implied or required, and alternative embodiments may exhibit different performance characteristics.

| Operation | Representative Configuration | Illustrative Throughput/ Latency | Notes |
|---|---|---|---|
| Single-kernel similarity + rolling-mean update | GPU (e.g., 80-SM class), M = 4096 agents, D = 1024, N = 16 | ~1.0 × baseline (reference) | May be associated with fewer intermediate global-memory writes; single launch |
| Two-kernel pipeline (similarity → rolling-mean) | Same configuration | ~0.75 × relative throughput | May involve an additional kernel launch and additional memory traversal |
| CPU CAS-loop fallback | 16-core CPU, AVX2, M = 4096, D = 1024 | ~0.10 × relative throughput | Deterministic behavior; throughput may reflect CAS-loop serialization |
| Fixed-point integer atomic update | GPU or CPU with 64-bit integer atomics | Comparable to floating-point atomicAdd | Scaling factor S may be selected to avoid overflow |
| Designated-writer publication | Any platform | Throughput may depend on queue depth | Deterministic ordering behavior may be maintained |

Overflow and Wraparound Handling

In some embodiments, a device-side counter such as head_ptr may use a 64-bit width to reduce the likelihood of wraparound in long-running deployments. Implementations using narrower counters may include optional overflow-handling procedures such as quiescent resets during coordinated host-synchronization windows, version tagging, epoch counters, or periodic checkpointing of counter state.

If counter reuse is possible, implementations may include ABA-mitigation techniques such as paired epoch counters, version tagging, or coordinated quiescent resets. Distributed deployments may persist counter state or epoch markers to support recovery and deterministic reconciliation.

Alternative Execution Embodiments

Multi-kernel pipelines: In some embodiments, similarity computation and rolling-mean updates may be executed using multiple kernels rather than a single consolidated kernel. This approach may be useful when device memory is limited or occupancy is insufficient. Multi-kernel pipelines may preserve ordering through explicit synchronization barriers.

CPU-based similarity computation: Similarity metrics may be computed on CPU platforms using vectorized instruction sets such as AVX2 or AVX-512. This may be useful in deployments lacking GPU or TPU acceleration. CPU-based computation may integrate into a deterministic update path using CAS-based atomic semantics.

FPGA or ASIC vector engines: In some embodiments, FPGA or ASIC accelerators may perform dot-product similarity or drift updates using custom logic. This may be useful in latency-sensitive or power-constrained deployments. Such accelerators may expose monotonic counters or serialized update channels to support ordered-updates.

Indexing and Synchronization Variants

Mutex-based or lock-based indexing: Platforms lacking efficient atomic fetch-and-add may use mutexes or locks to serialize access to a circular-buffer index. This may support deterministic index assignment on hardware without atomic primitives.

Host-coordinated block-allocation: In distributed embodiments, a host may allocate index blocks to devices to support deterministic global ordering. This may help manage multi-device contention for a shared counter.

Memory Layout Embodiments

Non-contiguous gather layouts: In some embodiments, agent embeddings may be stored in non-contiguous memory regions with explicit gather operations. This may be useful in fragmented or heterogeneous memory environments.

Block-major, row-major, column-major, or segmented layouts: Alternative memory layouts may be used depending on hardware cache structure or vectorization capabilities. These layouts may maintain stable per-agent offsets and deterministic traversal order.

Similarity Metric Variants

Similarity may be computed using cosine similarity, dot-product similarity, Euclidean distance, learned similarity embeddings, or other distance functions. These metrics may produce a scalar similarity value per-agent that feeds into a rolling-window or drift-tracking mechanism.

Drift Metric Variants

Drift-detection may use fixed-size rolling-windows, exponential moving averages, cumulative-divergence metrics, or other temporal statistics. These approaches may support different sensitivity profiles.

In some embodiments, each agent may maintain its own drift sensitivity or decay factor. This may support heterogeneous agent behaviors.

Routing Variants

Routing decisions may incorporate conflict-intensity, stochastic sampling, priority queues, or hybrid heuristics. These approaches may support diverse dialogue structures.

In some embodiments, routing may weight agents differently based on cognitive roles or user-defined preferences.

Synthesis Variants

Synthesis may use majority voting, weighted voting, hierarchical-aggregation, or rule-based selection. These approaches may support different task requirements.

In some embodiments, agent outputs may be blended using confidence scores or alignment-metrics.

Convergence Variants

Convergence may be determined using stability thresholds, confidence metrics, or time-based limits. These approaches may help support identification of when multi-agent reasoning has stabilized sufficiently to produce a coherent output.

Hardware Variants

The system may operate on GPUs, TPUs, CPUs, multi-GPU clusters, FPGA accelerators, or ASIC inference engines. These hardware variants may map atomic semantics and memory-ordering behavior to platform-specific primitives, enabling deterministic update behavior across heterogeneous devices.

Privacy and Access Control Variants

In some embodiments, privacy-aware configurations may restrict agents from accessing sensitive content using scoped memory regions or role-based visibility constraints. These approaches may help support prevention of unauthorized access to embeddings or intermediate representations. Such constraints may be applied before similarity computation.

Edge and Low-Power Variants

Low-power embodiments may reduce embedding dimensionality, use quantized models, or employ sparsified representations. These approaches may be useful on devices with limited compute or memory while maintaining deterministic update behavior.

In some embodiments, drift updates may occur intermittently to reduce energy consumption. This may be useful for battery-powered devices. Intermittent updates may be scheduled at fixed intervals.

Batching and Streaming Variants

The system may operate in batched, micro-batched, or streaming modes. These modes may support different latency or throughput requirements. Batch boundaries or streaming windows may be applied in a deterministic manner.

Degraded Mode Variants

In some embodiments, agents exhibiting instability or invalid outputs may be down-weighted or temporarily removed. This may help maintain system stability. Degraded-mode variants may apply suppression rules in a deterministic manner.

Human-in-the-Loop Variants

Human feedback may influence routing, weighting, or synthesis decisions. This may help align system behavior with user intent. Feedback may be applied as stable adjustments to agent parameters.

Temporal and Sequential Reasoning Variants

Temporal embodiments may apply recency weighting, temporal decay, or sequential-dependency modeling across multi-turn dialogues. These approaches may help capture long-range dependencies.

Tool-Using Agent Variants

Agents may invoke external tools, retrieval systems, or domain-specific modules. Tool outputs may be treated as additional embeddings or evidence-vectors.

Recovery Variants

Recovery strategies may include freezing unstable agents, reassigning roles, or rolling back partial state. These approaches may help maintain stability during long-running sessions.

Multimodal Variants

In some embodiments, input-signals may include text, audio, images, or other modalities. Multimodal variants may embed each modality into a shared vector-space while maintaining deterministic update behavior.

Determinism, Correctness, and Implementation Guidance

In some embodiments, a device-side running-sum such as sum_ptr may track the sum of the most recent N similarity values. An illustrative update sequence may compute delta=s_new−s_old, apply an atomic update to sum_ptr, and then overwrite the buffer slot. Memory fences and acquire-release semantics may help maintain ordering under concurrency.

An illustrative kernel update sequence may include: (1) reading the outgoing slot, (2) computing a delta, (3) performing an atomic read-modify-write, (4) publishing a rolling-mean using acquire-release semantics, and (5) overwriting the buffer slot. A device- or system-scope fence may support visibility to other devices or the host.

CPU implementations may map device-side atomics to acquire-release CAS loops, TPU/XLA implementations may map to AtomicRMW or equivalent, and FPGA implementations may use monotonic counters or arbitration logic. Multi-GPU or distributed embodiments may use host-coordinated block-allocation with persisted counters or epoch markers.

If a platform lacks acquire-release atomic primitives, alternative embodiments may use a designated-writer or host-coordinated epoch barriers to support deterministic ordering. Readers requiring low latency may perform acquire-ordered loads, while readers requiring cross-device consistency may perform host-side synchronization.

CPU Fallback—CAS Loop Atomic Update

In some embodiments, platforms lacking native floating-point atomic operations may emulate an atomic read-modify-write using an acquire-release compare-and-swap (CAS) loop. This approach may support deterministic update behavior and a running-sum invariant. An illustrative example is:

```
// CPU fallback: emulate atomicAdd(sum_ptr, delta) using CAS loop
float old=drift buffer[write_index]; // outgoing value (acquire)
float delta=sim−old;
float cur, cand;
do {
  cur=atomic_load_explicit(sum_ptr, memory_order_acquire);
  cand=cur+delta;
} while (!atomic_compare_exchange_strong_explicit(
  sum_ptr, &cur, cand,
  memory_order_acq_rel, memory_order_acquire));
float new_mean=cand/(float)N;
atomic_store_explicit(rolling_mean_ptr, new_mean,
  memory_order_release);
drift_buffer[write_index]=sim;
```

This CAS-loop embodiment may serialize updates in a deterministic order. ABA-mitigation techniques such as version tagging or epoch counters may be used where appropriate.

Memory-Fence Operations

Memory-fence operations may help enforce ordering constraints among writes performed by different thread blocks, devices, or kernels. Device-level fences such as _threadfence( ) or the OpenCL mem_fence primitive may help ensure that earlier writes become globally observable before later writes are issued. System-wide fences such as _threadfence_system( ) may help establish ordering across devices, and host-side synchronization mechanisms such as cudaDeviceSynchronize( ) may help ensure that all prior device operations complete before subsequent kernels or host computations begin. These ordering guarantees may help maintain correct sequencing of multi-agent updates and prevent reordering effects that could otherwise produce inconsistent state transitions.

In some embodiments, atomic operations may use acquire-release semantics where supported. Readers may use acquire-ordered loads, and writers may use release-ordered stores to support cross-platform consistency. Host readers may perform a synchronization step after kernel completion to support visibility of device writes.

In multi-device or distributed embodiments, device-level fences combined with host-coordinated barriers or persisted epoch markers may support global visibility and deterministic observation.

In some embodiments, sum_ptr may be initialized on the host to the arithmetic sum of the initial N buffer values prior to kernel launch. Helper placeholders such as atomicLoadAcquireIfAvailable and atomicExchAcquireReleaseIfAvailable may map to CAS loops, designated-writer semantics, or platform-specific atomic primitives.

Readers requiring a consistent rolling-mean may perform acquire-ordered loads. Host readers may perform host-side synchronization after kernel completion. Distributed embodiments may use persisted epoch markers or coordinator-mediated barriers.

Illustrative Performance Characteristics

In some embodiments, consolidating similarity computation, deterministic circular-buffer indexing, and rolling-sum updates into a single GPU kernel may be associated with fewer kernel-interaction events relative to multi-stage pipelines that launch separate kernels per stage. Such consolidation may be associated with favorable memory-access behavior by eliminating intermediate global-memory writes and may help support reduced synchronization activity. The magnitude of any performance characteristics may depend on hardware configuration, embedding dimensionality, agent count, rolling-window size, and implementation details.

Overflow, Wraparound, and Recovery Handling

In some embodiments, the device-side counter head_ptr may be implemented as a 64-bit monotonic counter to avoid practical wraparound in long-running deployments. Implementations using narrower counters or requiring extremely long uptimes may include explicit overflow-handling and recovery procedures to ensure that write indices remain unique and globally ordered. Examples include coordinated quiescent resets during host-synchronized maintenance windows, version tagging or paired epoch counters to mitigate ABA anomalies, and periodic checkpointing of counter state to durable storage so that hosts and devices can recover a consistent counter value after restart.

For distributed or multi-host deployments, the host may persist the global counter or epoch markers at checkpoints and provide a recovery protocol that invalidates partially allocated blocks and reconciles device state on restart. These measures may help support preservation of deterministic ordering and uniqueness of returned prior values across failures. If counter reuse is possible, implementations may include ABA-mitigation techniques such as paired epoch counters, version tagging, or coordinated quiescent resets.

Platform-Level Variations and Hardware Mapping

Alternative implementations may include multi-kernel pipelines, warp-level or block-level reductions, CPU-based similarity computation, FPGA or ASIC vector engines, mutex-based indexing instead of atomic fetch-and-add, non-contiguous memory layouts with explicit gather operations, or tiled or shared-memory dot-product kernels.

Equivalent atomic semantics may be realized on other platforms. CPU implementations may map device-side atomicAdd to an acquire-release CAS loop with optional version tagging to mitigate ABA. FPGA implementations may use a hardware monotonic counter and arbitration logic that returns the prior counter state, with a documented handshake protocol and expected arbitration latency. TPU/XLA implementations may map to xla::AtomicRMW or equivalent primitives with acquire-release semantics. Multi-GPU or distributed implementations may use host-coordinated block-allocation with persisted counters or epoch markers, with devices performing local fetch-and-add within assigned blocks while the host enforces global ordering and recovery.

Mutex-based or lock-based alternatives may be used where determinism or platform constraints require them, trading performance for simpler ordering semantics. Implementations may employ a 64-bit device-side counter or a quiescent-reset procedure to avoid counter wraparound in long-running systems. A single-kernel contiguous-tensor configuration may be selected in some embodiments due to coalesced memory-access behavior and reduced kernel-interaction events, although the invention is not limited to that configuration.

On platforms that do not provide native atomicAdd for 32-bit floating-point values, equivalent semantics may be implemented using one of several mappings. In one approach, the system performs atomic updates on an integer fixed-point representation by scaling by 2^s, using 64-bit integer atomics, and rescaling. In another approach, the system implements an acquire-release CAS loop on the floating-point bit pattern. In yet another approach, a designated-writer serializes updates while readers use acquire loads or host-synchronization. These mappings may help support preservation of the running-sum invariant across platforms.

The foregoing platform mappings and synchronization primitives are illustrative; other mechanisms that provide functionally equivalent deterministic behavior and visibility guarantees are within the scope of the disclosure.

Numerical Stability and Epsilon-Guarded Norms

In some embodiments, numerical stability may be maintained through epsilon-guarded normalization to avoid division by zero, extreme scaling, or catastrophic cancellation. Let norm(a) and norm(b) denote the L2 norms of the agent embedding and input-signal embedding respectively. To ensure stable cosine-similarity computation, the denominator may be computed as:

max(norm(a)*norm(b), epsilon)

where epsilon may be a small positive constant (for example, 1e-8). Implementations may choose alternative epsilon values or adaptive guards based on embedding dimensionality, dynamic range, or quantization characteristics. Fixed-point or quantized embodiments may scale embeddings by a factor $S={}_2$^s, perform integer dot-products and integer-norm products, and rescale the result to floating-point. Overflow and underflow may be mitigated by selecting s so that intermediate integer products remain within the accumulator width.

Example Epsilon Selection and Adaptive Guard

In one example, epsilon is set to 1e-8; alternative values such as 1e-6 or 1e-10 may be used depending on embedding dimensionality and dynamic range. An adaptive guard may set:

epsilon=kappa*sqrt(D)*sigma where D is embedding dimension, a is an estimate of per-component standard deviation, and x is a small constant (for example, 1e-3) to scale with vector length.

Illustrative Cosine Similarity Example

The following example is illustrative and is not intended to limit the scope of the claims. Let the agent embedding be a=[0.6, 0.8] and the input embedding be b=[0.3, 0.4]. The dot-product is:

(0.6*0.3)+(0.8*0.4)=0.50

The L2 norm of a is:

sqrt(0.6^2+0.8^2)=1.0

The L2 norm of b is:

sqrt(0.3^2+0.4^2)=0.5

The raw denominator norm(a)*norm(b) is therefore 0.5. Using an epsilon-guard of 1e-8:

max(0.5,1*e*-8)=0.5

The resulting cosine similarity is:

0.50/0.50=1.0

If the raw denominator were extremely small (for example, $1.2\times10^{10}$), the epsilon-guard would produce:

max(1.2*e*-10,1*e*-8)=1*e*-8 preventing division by a near-zero value and ensuring numerical stability.

Fixed-Point Scale Selection and Pseudocode

For fixed-point embodiments, a scaling factor S=2 s may be selected such that scaled products fit within an accumulator width W. An illustrative rule is:

*s*=floor(log 2((2^(*W*−1)−1)/(*D***v*_max^2)))

where vmax is a maximum per-component magnitude. Example pseudocode:

```
// epsilon-guarded cosine
den=max(norm_a*norm b, epsilon)
cos_sim=dot(a,b)/den
// fixed-point conversion
scaled_dot=round(dot(a,b)*S)
atomic_add_int(&running_sum_int, scaled_dot)
rolling_mean=running_sum_int/(N*S)
```

These mechanisms may help support deterministic similarity updates on platforms lacking floating-point atomic operations.

Routing Pseudocode and Deterministic Tie-Breaking

In some embodiments, a routing module may select agents based on similarity scores, drift-related metrics, or goal-alignment functions. An illustrative priority function may combine similarity, drift, and alignment-scores:

priority[idx]=w1*sim[idx]+w2*drift_score[idx]+w3*align[idx]

Deterministic tie-breaking may use lexicographic comparison of tuples such as:

(priority[idx], −sequence_number[idx], idx)

where sequence_number[idx] may be a monotonically increasing per-agent counter. Routing may select top-K agents, a maximum-priority agent, or a threshold-based subset. Alternative routing strategies such as softmax-sampling, epsilon-greedy exploration, or drift-penalized selection may also be used.

Weight Selection and Selection Policy

Illustrative weight ranges for w1, w2, and w3 may fall within [0.1,2.0], though practitioners may tune these values. Routing may select top-K agents (for example, K=1 or K=3) or agents with priority above a threshold T.

Timestamp Generation and Deterministic Tie-Breaking Pseudocode

In some embodiments, each agent may maintain a monotonically increasing sequence_number updated on each local event. An illustrative tie-breaking rule may compare:

(priority[idx], −sequence_number[idx], idx)

Example Pseudocode

```
// compute priority
priority[idx]=w1*sim[idx]+w2*drift_score[idx]+
   w3*align[idx]
// tie-breaking tuple
tie_tuple[idx]=(priority[idx], −sequence_number[idx],
   idx)
// select top-K by lexicographic sort
selected=topK_by_lexicographic(tie_tuple, K)
```

These routing and tie-breaking mechanisms may help support deterministic agent selection under concurrency.

Drift-Correction and Synthesis Weighting Pseudocode

In some embodiments, drift-correction adjusts similarity scores based on the rolling-mean or other drift indicators:

drift_score[idx]=sim[idx]−alpha*mu

A synthesis module may combine agent responses using weighting coefficients gamma1, gamma2, and gamma3. An illustrative goal-alignment-score is:

$$A\_i = gamma\_1 * coherence\_i - gamma\_2 * redundancy\_i + gamma\_3 * evidence\_i$$

A final synthesis weight may be computed using:

weight_i=softmax(beta*A_i)

or, in a deterministic linear weighting embodiment:

weight_i=max(A_i, 0)/sum_j max(A_j, 0)

These weighting mechanisms may help support production of coherent aggregated outputs from multiple agents.

Alternative Drift Metrics and Temporal Smoothing Embodiments

In alternative embodiments, the system may employ additional drift-detection metrics beyond rolling-mean cosine similarity. These alternatives may be useful in high-variance embedding-spaces, sparse-vector regimes, or workloads exhibiting bursty agent behavior. Each metric integrates into the rolling-window drift buffer and preserves deterministic update-ordering.

Trimmed Mean Drift. A trimmed-mean statistic may discard the top and bottom q % of similarity values before updating the drift buffer, which may help reduce sensitivity to transient spikes caused by scheduling jitter or unstable agent responses.

Median Drift. Median similarity across the rolling-window may be used when similarity distributions are skewed or heavy-tailed. A deterministic median-maintenance structure may preserve reproducible publication-semantics.

Quantile Drift. Lower quantiles such as the 10th or 25th percentile may detect early semantic divergence in scenarios where mean-based metrics provide limited sensitivity.

Spectral Drift. Drift may be computed using spectral norms, eigenvalue shifts, or principal-component deviation between recent embeddings and historical embedding subspaces. These approaches may be useful when embedding geometry evolves over time.

Kernel-Based Drift. RBF, polynomial, or learned kernel functions may be used when cosine similarity is insufficient in nonlinear embedding-spaces. Kernel-based drift may reuse the same vectorized dot-product pipeline and deterministic indexing.

Attention-Based Drift. Attention-weighted similarity may emphasize semantically relevant components and may help reduce sensitivity to high-dimensional noise in dense embedding-spaces.

Variance-Based Drift. Drift may be detected when the variance of similarity values exceeds a threshold, which may help identify oscillatory or unstable agent outputs.

Entropy-Based Drift. Entropy or dispersion measures over similarity distributions may identify unstable or highly variable agent responses. Entropy-based drift may integrate into the drift buffer using deterministic histogram or density-estimation updates.

Learned Drift Metrics. Neural networks or learned scoring functions may map embedding histories to drift scores. These approaches may be useful in domain-specific embedding-spaces where learned metrics may exhibit more expressive behavior in certain contexts. Learned drift models may operate on the same rolling-window data and may publish drift scores using acquire-release semantics to help support deterministic visibility.

Hybrid Drift Metrics. Weighted or learned combinations of rolling-mean, EMA, median, or spectral metrics may be used. Hybrid metrics may help support robustness across heterogeneous workloads while preserving deterministic update-ordering.

All such drift metrics may be computed on GPU, TPU, CPU, or heterogeneous-hardware. These approaches may support consistent behavior across diverse execution environments. The metrics may integrate into the deterministic drift-buffer framework and may help maintain ordering and visibility guarantees for consistent drift-detection.

Alternative Semantic-Change and Similarity Metrics

In some embodiments, the system may employ additional semantic-change metrics to evaluate divergence between agent outputs, input-signals, or evidence-vectors. These metrics may be useful in scenarios where cosine similarity provides limited sensitivity to semantic nuance. Each metric may integrate into the same vectorized similarity pipeline and deterministic update-ordering used for drift-detection, conflict computation, and alignment scoring.

Token-Distribution Divergence. KL divergence, Jensen-Shannon divergence, or chi-squared divergence may be used when agent outputs differ primarily in token-level distributions rather than embedding geometry. These metrics may be computed using vectorized histogram or probability-distribution operations and may feed directly into conflict and alignment modules.

Latent State Variance. Dispersion in hidden-state activations across cycles may be used to detect semantic drift in transformer-based agents. Latent-variance metrics may integrate into the agent-state tensor and may update deterministically alongside embeddings.

Kernel-Based Similarity. RBF, Laplacian, or polynomial kernels may capture nonlinear relationships between embeddings. Kernel similarity may reuse the same vectorized dot-product infrastructure and deterministic ordering semantics.

Attention Based Similarity. Cross-attention scores between embeddings may detect fine-grained semantic differences. Attention-based similarity may integrate into conflict and alignment modules without altering the drift-buffer invariant.

Learned Similarity Functions. Supervised or contrastive learning models may compute similarity scores tailored to domain-specific semantics. These models may operate on the agent-state tensor and may publish similarity values using deterministic acquire-release semantics.

These metrics may be used for drift-detection, conflict computation, alignment scoring, or synthesis weighting across diverse agent behaviors. They may help support consistent operation across heterogeneous semantic-change patterns and may integrate into the deterministic multi-agent pipeline while maintaining ordering and visibility guarantees.

Alternative Routing Mechanisms

Beyond conflict-weighted and topic-divergence routing, the system may employ additional routing strategies that may be useful in scenarios involving agent over-participation, semantic collapse, or limited diversity. Each routing mechanism may integrate into the deterministic priority-key framework and may preserve reproducible ordering across GPU, TPU, CPU, and distributed environments.

Entropy-Based Routing. Agents with high output uncertainty may be prioritized for rebuttal in scenarios associated with elevated ambiguity. Entropy-based routing may integrate into the priority-key computation and may help support convergence-related stability in noisy environments.

Uncertainty-Based Routing. Predictive variance or confidence intervals may be used to route rebuttals toward agents whose outputs require clarification. Uncertainty-based routing may integrate into the deterministic routing pipeline by producing reproducible priority values.

Calibration-Based Routing. Agents with elevated calibration error may be down-weighted to help prevent overconfident contributions. Calibration metrics may integrate into the agent-state tensor and may update deterministically.

Routing via Reinforcement-Learning Policies. Routing policies may be learned from reward signals reflecting reasoning-related behavior. This approach may be useful in scenarios where adaptive routing behavior may exhibit responsiveness to evolving agent dynamics. Learned routing may integrate into the deterministic priority-key structure by producing stable, reproducible priority scores.

Graph-Based Routing. Graph-centrality or community-detection metrics may be used to identify influential agents. These approaches may be useful when relational dependencies between agents provide additional structure for routing. Graph-based routing may integrate into the dialogue-turn graph and may preserve deterministic ordering.

Probabilistic Routing. Rebuttal targets may be sampled from probability-distributions derived from conflict or divergence metrics. This may be useful in high-variance environments where controlled stochasticity supports exploration while deterministic tie-breaking preserves reproducibility across hardware platforms.

Mixture-of-Experts Gating. Gating networks may select agents for rebuttal based on learned expertise. This may be useful in specialized tasks where expert agents contribute domain-specific insight. Gating outputs may integrate into the deterministic routing pipeline to help ensure reproducible expert selection.

Routing Based on Predicted Divergence Measures. Agents predicted to influence semantic spread may be prioritized in scenarios associated with convergence-related behavior. Divergence-related routing may integrate into the deterministic priority-key computation to help maintain reproducible ordering.

Consensus-Based Routing. Agents farthest from consensus vectors may be selected to surface disagreements that materially affect synthesis behavior. Consensus-based routing may integrate into the deterministic pipeline to help ensure reproducible selection of disagreement sources.

Hash-Based or Timestamp-Based Deterministic Tie-Breaking. Stable hash functions or Lamport or vector-clock timestamps may be used to break ties when multiple agents share identical priority values. Incorporating these deterministic secondary keys may help ensure reproducible routing decisions across GPU, TPU, CPU, and distributed environments.

All routing mechanisms may be executed using deterministic ordering across GPU, TPU, CPU, or distributed environments. These approaches may help support consistent routing behavior under parallel or heterogeneous execution. These mechanisms may integrate into the deterministic multi-agent pipeline and may help maintain the reproducible priority-key semantics required for stable routing.

Alternative Synthesis and Aggregation Mechanisms

In addition to weighted linear aggregation, the system may employ alternative synthesis mechanisms that may be useful in scenarios involving redundancy, semantic fragmentation, or multi-scale reasoning. These mechanisms may integrate into the deterministic synthesis pipeline and may help preserve reproducible weighting across GPU, TPU, CPU, and distributed environments. Each mechanism may exhibit qualitative characteristics such as reduced noise sensitivity, convergence-related stability, or semantic-fidelity characteristics.

Hierarchical Aggregation. In some embodiments, agents may be grouped into semantically coherent clusters before final synthesis. This may be useful when large agent populations produce redundant or highly correlated outputs. Integrating hierarchical-aggregation into the deterministic pipeline may be associated with particular memory-access patterns and may help support synthesis stability.

Graph-Based Aggregation. The system may use the dialogue-turn graph to weight contributions based on rebuttal structure or graph centrality. These approaches may be useful when relational dependencies between agents provide additional semantic structure. Graph-based aggregation may integrate into the deterministic weighting path and may be associated with coherence-related behavior.

Token-Level Aggregation. Token-distributions or logits may be merged directly when embedding-level vectors provide limited lexical precision. Token-level aggregation may integrate into the deterministic pipeline and may be associated with output-fidelity characteristics in tasks requiring precise token control.

Semantic-Level Aggregation. Latent semantic vectors may be combined using learned or rule-based weighting to capture higher-order conceptual relationships. Semantic-level aggregation may integrate into the deterministic synthesis path and may be associated with reasoning-related behavior in complex domains.

Mixture-of-Experts Synthesis. A gating network may select or weight expert agents based on learned specialization. This may be useful in domain-specific reasoning tasks. Integrating gating outputs into the deterministic pipeline may help ensure reproducible expert selection across hardware.

Synthesis via Reinforcement-Learning-Derived Weights. Aggregation weights may be optimized using reward signals reflecting output-related characteristics. RL-based synthesis may integrate into the deterministic aggregator by producing stable, reproducible weight vectors.

Consensus-Based Synthesis. Consensus vectors may be computed to help stabilize synthesis in high-variance environments. Consensus-based synthesis may integrate into the deterministic pipeline using fixed-order reduction operations.

Spectral-Aggregation. Eigenvector-based weighting may be used to emphasize principal semantic components across agent outputs. This approach may be useful in scenarios involving noisy or high-dimensional embeddings where highlighting dominant semantic directions may exhibit stable behavior. Spectral-aggregation may integrate into the deterministic pipeline using fixed-order linear-algebra routines.

Trimmed Mean Aggregation. Extreme contributions may be discarded before aggregation to reduce sensitivity to outlier or unstable agent outputs. Trimmed-mean aggregation may integrate into the deterministic synthesis pipeline by applying fixed-order filtering before weighted combination.

These embodiments may be used independently or in combination across diverse reasoning tasks. They may be useful in heterogeneous agent environments where multiple aggregation modes provide complementary behavior. All such mechanisms may integrate into the deterministic synthesis pipeline and may help preserve the reproducible weighting semantics required for stable multi-agent aggregation.

Memory, Precision, and Storage Variants

Alternative memory and precision embodiments may be useful in scenarios involving limited device memory, heterogeneous-hardware constraints, or execution on edge devices. Each variant may integrate into the agent-state tensor, drift buffer, or synthesis pipeline while helping preserve deterministic update-ordering and compatibility with GPU, TPU, and CPU execution.

Memory Layout Variants. In some embodiments, the system may employ alternative memory layouts to accommodate hardware-level considerations such as cache size limits, NUMA boundaries, or memory-fragmentation effects that influence vectorized similarity behavior. These layouts may integrate directly into the agent-state tensor and drift-buffer structures while helping preserve deterministic indexing and update-ordering. These variants may be associated with locality-related behavior and may influence throughput characteristics across GPU, TPU, and CPU architectures.

Block-Tiled Memory Layouts. Block tiling may be used to influence cache-locality behavior and memory-fragmentation patterns. This approach may be useful in scenarios where large contiguous tensors interact with device-specific cache-capacity constraints. Integrating block tiling into the agent-state tensor may be associated with particular throughput characteristics during vectorized similarity computation.

Sparse-Memory Representations. Sparse formats may be used when agent embeddings or meta-metrics contain many zero or near-zero values. This approach may be useful in scenarios where dense representations consume unnecessary memory-bandwidth. Sparse layouts may integrate into the deterministic indexing path by maintaining stable coordinate ordering.

Compressed-Memory Formats. Compression may be applied to embeddings or drift-buffer entries to reduce memory-footprint. This approach may be useful on edge devices or multi-tenant systems where memory capacity is constrained. Compressed formats may integrate into the deterministic pipeline by decompressing in fixed order before similarity computation.

Quantized-Memory Storage. Quantized storage may be used to reduce precision while maintaining acceptable accuracy. This approach may be useful when large agent populations require reduced memory usage. Quantized tensors may integrate into the deterministic update path using fixed scaling factors.

Mixed-Precision Memory. Mixed-precision layouts may store different fields at different bit widths depending on sensitivity. This approach may be useful when uniform precision would otherwise allocate unnecessary memory to low-sensitivity fields. Mixed-precision storage may integrate into the deterministic pipeline by applying fixed conversion rules.

Hierarchical-Memory Layouts. L1-, L2-, and L3-aware layouts may be used to structure memory access across cache levels. This approach may be useful in scenarios where cache behavior influences large-scale similarity computation. Hierarchical layouts may integrate into the deterministic pipeline by preserving fixed memory-traversal order.

Multi-Shard Memory Across Devices. Memory may be sharded across devices to support large agent populations. This approach may be useful when single-device memory capacity is insufficient. Sharded memory may integrate into the deterministic pipeline using fixed-order merge semantics.

Distributed-Memory with Deterministic-Merge Semantics. Distributed memory may be used when agents operate across multiple nodes. This approach may be useful in distributed environments where consistent update-ordering is required. Deterministic-merge semantics may help support reproducible drift-buffer and synthesis behavior.

Precision Variants

FP16, BF16, INT8, or mixed-precision arithmetic may be used to reduce memory-bandwidth or adjust computational characteristics. This approach may be useful in scenarios involving large embedding dimensions or constrained hardware. Integrating reduced-precision arithmetic into the deterministic pipeline may influence throughput while helping preserve reproducible update-ordering through fixed rounding rules.

Quantized Similarity Computation. Similarity metrics may be computed directly on quantized embeddings without dequantization. This approach may be useful when dequantization overhead affects vectorized operations. Quantized similarity may integrate into the deterministic update path using fixed quantization parameters to help ensure reproducible results.

Compressed Embedding Storage. Embeddings may be stored in compressed form to reduce memory-footprint and influence cache-utilization behavior. This approach may be useful when large embedding matrices interact with device memory limits or cause memory stalls. Compressed embeddings may integrate into the deterministic pipeline by decompressing in fixed order before similarity computation.

Block-Tiled or Sparse Storage Formats. Block-tiled or sparse storage formats may be used to reduce memory-bandwidth during similarity computation. This approach may be useful when dense formats expend compute cycles on zero or redundant values. These formats may integrate into the deterministic pipeline by preserving stable index ordering across all update-operations.

These embodiments may be used to adjust memory-footprint, throughput characteristics, or edge-deployment feasibility across heterogeneous-hardware. These approaches may be useful in environments where uniform memory and precision strategies do not scale across devices with differing bandwidth, capacity, or compute characteristics. All such variants may integrate into the deterministic multi-agent pipeline and may help preserve the fixed-order update-semantics required for reproducible similarity computation and aggregation.

Deterministic Ordering and Synchronization Variants

Beyond atomic fetch-add and CAS loops, deterministic ordering may be enforced using additional synchronization mechanisms. These mechanisms may be useful in scenarios involving concurrency effects such as nondeterministic scheduling, race conditions, or inconsistent update-ordering across heterogeneous-hardware. Each mechanism may integrate into the drift buffer, routing, or synthesis pipeline while helping preserve the running-sum invariant and reproducible multi-agent behavior.

Deterministic Lock-Free Queues. Lock-free queues may be used to serialize updates without blocking. This approach may be useful in high-contention environments where interleaving must remain predictable. Deterministic lock-free queues may integrate into the update-pipeline by enforcing fixed dequeue order.

Deterministic Ticket Locks. Ticket locks may be used to enforce strict FIFO ordering of updates. This approach may be useful when update order must remain consistent to preserve drift-buffer invariants. Ticket locks may integrate into the deterministic pipeline by ensuring each update is applied in ticket order.

Deterministic Hardware Queues. Hardware queues may be used to enforce deterministic ordering at the device level. This approach may be useful in GPU environments where warp-level execution order varies. Hardware queues may integrate into the drift-buffer update path by providing fixed-order dispatch.

Warp-Synchronous Primitives. Warp-synchronous operations may be used to enforce deterministic execution within GPU warps. This approach may be useful when divergent warp execution paths would otherwise introduce nondeterminism. Warp-synchronous primitives may integrate into the deterministic pipeline by ensuring uniform execution order.

Deterministic Cooperative Groups. Cooperative groups may be used to coordinate deterministic execution across thread blocks. This approach may be useful when block-scheduling order varies across runs. Cooperative groups may integrate into the update-pipeline by enforcing fixed synchronization points.

Deterministic Barrier-Based Ordering. Barriers may be used to enforce deterministic phase boundaries in multi-stage updates. This approach may be useful when partial updates must not become visible prematurely. Barrier-based ordering may integrate into the deterministic pipeline by ensuring all threads complete each phase before proceeding.

Per-Block Counters Merged Deterministically. Per-block counters may accumulate updates locally before merging them in deterministic order. This approach may be useful when global contention on shared counters affects throughput. Deterministic merging may help support reproducible drift statistics across devices.

These mechanisms may help support reproducible execution across GPU, TPU, CPU, or heterogeneous systems. These approaches may be useful in environments where scheduling and concurrency effects influence multi-agent behavior. All such synchronization variants may integrate into the deterministic update-pipeline and may help preserve the fixed-order semantics required for stable drift-buffer, routing, and synthesis operations.

Multimodal and Cross-Modal Embodiments

In multimodal embodiments, agent embeddings may incorporate representations from multiple data modalities. This approach may be useful in scenarios where text-only embeddings provide limited coverage of cross-modal semantic-relationships. Drift metrics, routing functions, and synthesis mechanisms may operate on multimodal or cross-modal representations using the same deterministic update-ordering described earlier.

Text Embeddings. Text embeddings may be used for language-based reasoning tasks where semantic-relationships between tokens must be preserved across multi-agent cycles. This approach may be useful when symbolic or rule-based representations provide limited contextual depth for drift-detection, routing, and synthesis. Text embeddings may integrate into the agent-state tensor and deterministic similarity pipeline, enabling reproducible vectorized operations across GPU, TPU, and CPU hardware.

Image Embeddings. Image embeddings may be used when agents reason over visual content. This approach may be useful in scenarios where visual semantics complement or extend text-based representations. Image embeddings may integrate into the deterministic drift buffer and routing modules.

Audio Embeddings. Audio embeddings may be used for speech or acoustic reasoning tasks. This approach may be useful when temporal or tonal information contributes to semantic-interpretation. Audio embeddings may integrate into the deterministic similarity pipeline.

Video Embeddings. Video embeddings may be used for temporal-spatial reasoning. This approach may be useful when motion or sequential visual information is relevant to agent behavior. Video embeddings may integrate into the deterministic drift and synthesis modules.

Sensor Data Embeddings. Sensor embeddings may be used for robotics or IoT reasoning tasks. This approach may be useful when real-world state information contributes to agent decision processes. Sensor embeddings may integrate into the deterministic update path.

Cross-Modal Embeddings. Cross-modal embeddings such as CLIP-style joint spaces may be used to unify multiple modalities. This approach may be useful when consistent semantic-alignment across modalities is desired. Cross-modal embeddings may integrate into the deterministic drift buffer and synthesis pipeline.

Privacy-Preserving, Federated, and Secure-Aggregation Embodiments

In privacy-sensitive or distributed environments, the system may employ privacy-preserving, federated, or encrypted-computation techniques to help ensure that agent interactions remain secure while maintaining deterministic update-ordering. These embodiments may be useful in scenarios involving data-confidentiality requirements, regulatory considerations, or cross-device trust boundaries. Each mechanism may integrate into the drift-detection, routing, and synthesis pipelines without altering the deterministic execution semantics described earlier.

Privacy-Preserving Computation. Differential-privacy or noise-injection mechanisms may be applied to similarity values or drift metrics before publication. This approach may be useful when embedding-space operations involve sensitive information. Integrating differential privacy into the deterministic update path may help support reproducible behavior while protecting confidential data.

Federated Computation. In some embodiments, agents may operate on local data without sharing raw embeddings, transmitting only aggregated or masked statistics. This approach may be useful in environments with data-residency or locality constraints. Federated updates may integrate into the deterministic drift buffer and synthesis pipelines using fixed-order merge semantics.

Encrypted-Computation. Homomorphic encryption or secure-enclaves may be used to compute similarity metrics or drift statistics on encrypted embeddings. This approach may be useful when operating on untrusted hardware or in multi-tenant execution environments. Encrypted-computation may integrate into the deterministic pipeline by applying fixed decryption or enclave-release ordering.

Secure-Aggregation Protocols. Secure-aggregation may be used to ensure that only aggregated statistics, not individual agent contributions, are revealed. This approach may be useful when agent-level outputs require confidentiality during synthesis. Secure-aggregation may integrate into the deterministic update path by enforcing fixed-order combination of encrypted or masked values.

These embodiments may be combined with drift-detection, routing, and synthesis mechanisms across privacy-sensitive or distributed environments. These approaches may be useful when end-to-end protection is desired across multi-agent systems. All such mechanisms may integrate into the deterministic execution-pipeline and may help preserve the fixed-order semantics required for reproducible behavior across heterogeneous-hardware.

ML-Learned Policies and Adaptive-Control Embodiments

In alternative embodiments, machine-learning models may learn adaptive-control policies that replace or augment rule-based mechanisms. These learned policies may be useful in scenarios where static thresholds or heuristics provide limited generalization across diverse workloads or evolving agent behavior. Each learned component may integrate into the deterministic pipeline by producing stable, reproducible outputs under fixed evaluation order.

Drift-Threshold Policies. Machine-learning models may infer drift-thresholds based on historical behavior or semantic-change patterns. This approach may be useful when manually tuned thresholds vary in effectiveness across shifting embedding distributions. These thresholds may integrate into the deterministic drift-evaluation pipeline by producing fixed, reproducible threshold values for each update cycle.

Routing Policies. Supervised or reinforcement-learning models may learn routing strategies that determine which agents should rebut or respond during each cycle. This approach may be useful when routing behavior benefits from adaptation to complex or domain-specific reasoning patterns. These routing policies may integrate into the deterministic priority-key structure by generating stable priority scores under fixed inference order.

Aggregation Weight Policies. Aggregation weights may be learned from quality-metrics, human feedback, or reinforcement signals. This approach may be useful when nuanced agent contributions require more flexible weighting than uniform or hand-tuned schemes. These learned weights may integrate into the deterministic synthesis pipeline by producing reproducible weight vectors that maintain stable ordering across hardware.

Learned policies may operate alongside or replace rule-based mechanisms across diverse reasoning workloads. These approaches may be useful when agent behavior, task distributions, or domain requirements evolve over time. All such learned policies may integrate into the deterministic update-pipeline and may help preserve the fixed-order semantics required for reproducible multi-agent behavior.

Temporally Smoothed Similarity Structures (P1, P2, P3)

A temporally smoothed similarity structure is any data structure or accumulator that deterministically computes a smoothed similarity statistic from a finite, ordered sequence of recent similarity inputs according to a fixed-update-rule and that exposes the computed statistic through a defined publication-event. These structures may provide stable and reproducible similarity estimates under noisy or rapidly changing inputs, which may help support drift-detection and multi-agent coordination on parallel hardware. Non-limiting examples include a drift-vector circular buffer with a running-sum, an exponential moving average, a fixed-size trimmed-mean accumulator, and a fixed-size spectral estimator. A temporally smoothed similarity structure may satisfy properties P1 through P3 as follows.

P1 deterministic computability. The structure may compute its output deterministically from the most recent similarity inputs using a fixed-update-rule such that, given the same ordered input sequence and internal state, the structure produces the same output. Deterministic computability may include deterministic ordering of updates and deterministic resolution of concurrent updates when implemented on parallel hardware.

P2 bounded-state. The structure may maintain bounded internal state whose size does not grow without bound over time. Examples include a fixed number of scalar accumulators, a fixed-size circular buffer of length N, a fixed set of coefficients, or a fixed-size accumulator window. Bounded-state excludes unbounded history buffers or state that grows with runtime.

P3 publication-semantics. The structure may provide a defined publication-event after which readers performing an acquire-ordered load observe the published statistic and all preceding writes that contributed to it. The publication-event may be implemented by an atomic exchange, an atomic store with release semantics, writing a sequence-number together with the statistic using release semantics, or an equivalent operation that provides acquire-release visibility to readers. Publication-semantics may include any sequence-number or epoch-tagging scheme that enables deterministic ordering and mitigates ABA hazards when indices are reused.

Non-limiting examples and enablement notes include the following. A circular drift buffer of length N may maintain an atomic running-sum using a CAS loop or native atomicAdd together with a sequence-number and a device-level fence. An exponential moving average may use an update-rule of the form $m_t$=smoothing factor·$s_t$+(1−smoothing factor)·$m_t$−1, implemented with deterministic update-ordering and a defined publication-event. A fixed-size trimmed-mean accumulator may maintain bounded-state and publish its output using an atomic exchange. A fixed-size spectral estimator may deterministically compute a smoothed metric from the same recent inputs. Alternative implementations may include fixed-point integer atomics with scaling-factor selection and accumulator-width selection to avoid overflow, designated-writer shards that serialize updates per shard, host-allocated index blocks for deterministic cross-device ranges, and coordinator-based merge protocols that apply deltas in logical-timestamp order with epoch markers for recovery. Each example may be enabled when implemented with deterministic update-ordering, sequence or epoch-tagging where appropriate, and a defined publication-event as described above.

The specification provides pseudocode and fallback implementations, including CAS loops, fixed-point scaling rules, designated-writer shards, and host-coordinator merge procedures, to enable embodiments that implement P1 through P3 on a variety of hardware platforms. These mechanisms are non-limiting implementation examples and do not assert measured performance; actual behavior may depend on hardware, workload, and implementation choices.

Representative fused-kernel pseudocode for device execution is shown below. This example illustrates deterministic circular-buffer indexing, atomic running-sum maintenance, and publication-semantics.

```
for each agent i in parallel:
    dot=dot_product(agent_embedding[i], input_embedding)
    denom=max(agent_norm[i]*input_norm, eps)
    s_new=dot/denom
    prior=atomic_fetch_add(head_ptr, 1)
    write_index=prior % N
    seq=prior
    old=atomic_load_acquire(drift_buffer[write_index])
    delta=s_new−old
do:
    cur=atomic_load_acquire(running_sum)
    cand=cur+delta
while (!atomic_compare_exchange_strong_acq_rel(running_sum, cur, cand))
mu=cand/N
atomic_store_release(rolling_mean_value, mu)
atomic_store_release(rolling_mean_seq, seq)
```

This fused-kernel example is illustrative and non-limiting. Equivalent CPU, GPU, TPU, FPGA, or distributed implementations may be used, provided that deterministic computability, bounded-state, and publication-semantics are preserved.

Additional Alternative Embodiments

In additional alternative embodiments, the system may incorporate energy-aware, cost-aware, or thermal-aware update strategies in which drift computation, routing, or synthesis operations are scheduled or weighted according to power consumption, device temperature, or resource-usage constraints. These embodiments may be used in mobile, edge, or large-scale inference deployments.

In fault-tolerant embodiments, the system may maintain crash-consistent drift buffers, deterministic replay logs, or checkpointed agent-states. Recovery procedures may reconstruct the temporally smoothed similarity structure using persisted sequence-numbers, epoch markers, or deterministic-merge logs. These embodiments may help support correctness under partial device failure or network partition.

In adversarial-robust embodiments, the system may detect adversarial drift patterns, apply robustness-weighted routing, or adjust synthesis weights based on anomaly-scores or adversarial-resistance metrics. These embodiments may be used in security-sensitive or safety-critical deployments.

In human-in-the-loop embodiments, the system may incorporate human-validated drift-corrections, human-guided routing overrides, or human-adjusted synthesis weights. These embodiments may allow interactive control in regulated or expert-supervised environments.

In temporal-reasoning embodiments, the system may incorporate long-horizon temporal weighting, time-decayed drift metrics, or temporal-coherence routing strategies that account for multi-cycle dependencies or long-term semantic trends.

In hybrid symbolic-neural embodiments, the system may incorporate rule-based drift-correction, symbolic conflict detection, logic-based routing, or hybrid synthesis mechanisms that combine symbolic and neural representations.

In hardware-specific embodiments, the system may be implemented on FPGA, ASIC, or neuromorphic hardware using deterministic update-pipelines, fixed-point accumulators, or hardware-specific synchronization primitives. These embodiments may be associated with latency-related, power-related, or determinism-related characteristics depending on hardware configuration.

Dialogue Controller and Structured Rebuttal Cycles

The dialogue controller orchestrates structured rebuttal cycles that coordinate agent interactions across multiple reasoning rounds. Each cycle may include agent-response generation, conflict-weighted routing, targeted-rebuttal generation, and synthesis aggregation. These cycles may help ensure that agents contribute to relevant disagreements and may support coherent multi-agent coordination.

The controller may adjust routing decisions based on drift status, conflict-intensity, and alignment-metrics computed during prior cycles, and may enforce bounded rebuttal depth to prevent unproductive loops. In one embodiment, the dialogue controller may read and write device-visible state such as agent_weights[M], agent_scores[M], agent_alignment[M], head_ptr, sum_ptr, and rolling_mean_ptr, and may use these arrays to compute routing, selection, and synthesis decisions in a vectorized, single-kernel or host-coordinated manner. The controller may enforce bounded rebuttal depth and deterministic tie-breaking by storing per-node epoch counters and deterministic priority keys (for example, (priority_score, epoch_counter, agent_id)) in the dialogue-turn graph.

In some embodiments, the system may employ a routing module that determines which agents should rebut, respond, or contribute during each reasoning cycle. The routing module may evaluate internal signals stored in the agent-state tensor, including conflict metrics, divergence indicators, and alignment-scores. Deterministic, hardware-accelerated vector operations may be applied to compute routing decisions. These computations may help support reproducible multi-agent behavior across devices and may help reduce nondeterministic oscillations arising from concurrent updates or hardware-level scheduling differences.

(1) Conflict and Divergence Metrics

For each agent pair (i, j), the system may compute conflict-intensity and topic-divergence scores. An illustrative conflict-intensity computation may include:

$$C\_ij=1-\cos(x\_i, x\_j)$$

Cosine similarity may be computed using epsilon-guarded norms to help support numerical stability. Topic-divergence metrics may include embedding-space divergence, token-distribution divergence, or learned semantic-change functions.

(2) Priority Function

The routing module may compute a per-agent priority score using a conflict-weighted priority function. An illustrative computation may include:

$$priority\_i=a*C\_i+b*D\_i+g*Ai$$

Where C_i is aggregated conflict-intensity, D_i is topic-divergence, and A_i is an alignment-score. The coefficients a, b, and g may be static, learned, user-adjusted, or dynamically adapted based on drift status. These computations may provide the routing module with the signals required to determine routing decisions during each reasoning cycle.

Deterministic Tie-Breaking

To help ensure reproducible routing decisions across devices and distributed deployments, the system may apply deterministic tie-breaking. In one embodiment, agents may be ordered lexicographically by the composite key: (priority_i, −sequence_number_i, agent_id). The sequence-number may be a monotonically increasing per-agent counter updated on each local state change.

Top-K Selection

The routing module may select rebuttal targets using deterministic top-K selection. Implementations may use partial quickselect, radix-selection on integerized keys, or equivalent deterministic routines. Selected targets may be written into device-visible arrays for use by the dialogue controller.

Drift-Aware Routing Adjustments

When drift-detection indicates semantic divergence, the routing module may down-weight drifting agents, reassign rebuttal targets, adjust routing sensitivity, or trigger partial or full reinitialization of agent roles. These adjustments may help support coherent and productive rebuttal cycles.

Alternative Routing Embodiments

In alternative embodiments, the system may employ softmax-sampling, epsilon-greedy exploration, drift-penalized routing, or learned routing policies trained using supervised or reinforcement-learning. These alternatives may be useful in scenarios where deterministic top-K routing benefits from additional exploration, drift responsiveness, or user-directed behavioral constraints. Each embodiment may preserve deterministic ordering when required for reproducibility and may integrate into the controller's routing pipeline across GPU, TPU, CPU, or heterogeneous compute environments.

Dialogue Turn Graph and Rebuttal Structure

The controller may maintain a dialogue-turn graph in which nodes represent agent outputs and edges represent rebuttal relationships. The graph may record conversational structure, may support conflict-resolution logic, and may help reduce unproductive rebuttal loops. Each node may store timestamps, drift-status flags, conflict-intensity annotations, alignment-metrics, and epoch counters.

The graph may enable the controller to track semantic evolution across cycles and to identify when agents diverge, converge, or repeat content. The graph structure may support detection of redundant contributions and enforcement of rebuttal-depth limits to help maintain coherent multi-agent discourse across extended reasoning sequences. Each graph update and corrective action may be appended to a correction_log with a Lamport timestamp or vector clock to enable deterministic reconciliation across hosts and to support replay or audit of drift-corrections and routing decisions.

Synthesis Module

The synthesis module may aggregate agent outputs into a unified summary vector or natural-language response. The module may use conflict, drift, and alignment-metrics to compute per-agent weights that determine each agent's contribution to the synthesized output.

Alignment-Score Computation

For each agent i, the system may compute an alignment-score using a weighted combination of coherence, redundancy, and evidence similarity.

An illustrative computation may include:

A_i=g1*coherence_i−g2*redundancy_i+g3*evidence_i

Where coherence_i may be similarity to a reference-embedding, redundancy_i may be maximum similarity to other agents, and evidence_i may be similarity to evidence-vectors. All similarity computations may use epsilon-guarded norms. The coefficients g1, g2, and g3 may be static, learned, or dynamically adjusted.

Weight Computation

In some embodiments, synthesis weights may be computed using a softmax over a linear-combination of metrics.

An illustrative computation may include:

w_i=exp(alpha*C_i+beta*A_i−delta*Di)

sum_j exp(alpha*C_j+beta*A_j−delta*D_j)

An alternative deterministic embodiment may include:

w_i=max(A_i, 0)/sum_j max(A_j, 0)

These computations may help support stable and deterministic synthesis weighting across heterogeneous-hardware platforms.

Weighted Aggregation

The synthesized vector S may be computed as:

S=sum_i(w_i*x_i)

where x_i is the agent's embedding. This aggregation may emphasize contributions associated with coherence, non-redundancy, and evidence-related characteristics while down-weighting agents exhibiting drift-related or low-alignment behavior.

Decoding the Synthesized Vector

The synthesized vector may be decoded into natural-language using a transformer-based decoder, a learned projection layer, or decoding strategies such as beam-search, top-K sampling, nucleus-sampling, or temperature-scaling.

Alternative Aggregation Embodiments

In alternative embodiments, the system may employ attention-based weighting, mixture-of-experts gating, rule-based weighting driven by user nudges, hierarchical-aggregation pipelines, or graph-based aggregation using the dialogue-turn graph. These alternatives may be useful in scenarios where linear weighting provides limited ability to capture cross-agent dependencies, hierarchical structure, or user-directed constraints. Each embodiment may integrate into the deterministic synthesis pipeline and may operate on GPU, TPU, CPU, or heterogeneous compute environments while helping preserve reproducible aggregation behavior.

Structured Rebuttal Loop and Deterministic Controller Execution

In one embodiment, the controller may execute the following high-level loop. The pseudocode below is an illustrative, non-limiting example of a vectorized, deterministic structured-rebuttal cycle that writes per-agent metrics to device-visible arrays and uses deterministic selection for rebuttal routing. This structured loop may provide a reproducible and hardware-efficient mechanism for coordinating multi-agent reasoning, helping ensure that conflict evaluation, drift tracking, and rebuttal assignment follow a consistent ordering across devices and parallel execution environments.

```
for t in 0 . . . T-1: // vectorized, deterministic loop
responses=generate_agent_responses(agents, input signal)
// vectorized compute of per-agent metrics (device-visible arrays)
conflicts=compute_conflict_intensity_vectorized(responses)
divergence=compute_topic_divergence_vectorized(responses)
alignment_scores=compute_alignment_vectorized(A)
// deterministic routing: build priority keys and select top-K deterministically
priority_keys=build_priority_keys(agent_weights,
    agent_alignment,
    epoch_counters)
targets=deterministic topK_select(priority_keys, K)
rebuttals=generate_rebuttals(agents, targets)
// update agent-state tensor fields (device-visible)
update_agent_state_tensor(A, responses, rebuttals)
```

```
// drift tracking (device-side deterministic fetch-add indexing)
perform_device_drift_updates(responses,
    head_ptr,
    sum_ptr,
    rolling_mean_ptr,
    drift buffer)
// drift-detection and correction
if rolling_mean_similarity( )<theta_d:
    log_correction(correction_log, lamport_ts, agent_index, action)
    apply_drift_correction(A)
// convergence detection
if convergence_criteria_met(alignment_scores,
    conflict_threshold,
    synth_change):
break
```

Drift-correction may include reinitializing embeddings, adjusting cognitive-style parameters, or reweighting synthesis coefficients. Convergence detection may rely on stability of alignment-scores, reduced conflict-intensity, or minimal change in synthesized outputs across cycles. The controller may adapt K and rebuttal depth based on runtime resource constraints and may record user nudges in the agent-state tensor so that subsequent kernel invocations observe updated routing parameters.

Conflict-Weighted Routing

The system may compute conflict-intensity between agent outputs to determine which agents should rebut or respond during each reasoning cycle. In one embodiment, pairwise conflict-intensity between agents i and j may be defined as:

C_ij=1−cos(x_i, x_j)

Cosine similarity may be evaluated using epsilon-guarded norms to help support numerical stability. Higher values may indicate greater semantic disagreement.

A priority function may determine rebuttal targets by combining aggregated conflict-intensity C_i and topic-divergence D_i. In one embodiment, the routing computation may write per-agent weights into a contiguous array agent_weights[M] and may select targets deterministically using stored priority keys. The priority function may be linear, nonlinear, or learned depending on the embodiment.

Example Weighted Linear Routing

In one embodiment, routing priorities may be computed as:

priority[i]=alpha*conflict_score[i]+beta*divergence_score[i]

Where alpha and beta are tunable-parameters stored in the agent-state tensor and may be static, learned, or dynamically adjusted based on drift status, alignment-metrics, or user nudges.

Ties may be broken deterministically by forming priority keys:

(priority[i], epoch_counter[i], agent_id)

Deterministic top-K selection may then be performed, for example using partial quickselect or radix-selection on integerized keys. Selected targets may be recorded in agent_scores[M] for downstream-synthesis and logging.

Deterministic Tie-Breaking

In one embodiment, routing and selection operations may use deterministic tie-breaking to help ensure reproducible top-K results across devices, hosts, and distributed deployments. When two or more agents share the same priority value, the system may form a composite key such as:

(priority[i], epoch_counter[i], agent_id)

where epoch_counter[i] is a monotonically increasing per-agent sequence-number and agent_id is a unique identifier.

Deterministic top-K selection may then be performed using partial quickselect, radix-selection on integerized keys, or any equivalent deterministic routine. Alternative embodiments may use timestamp-based ordering, Lamport clocks, vector clocks, or lexicographic ordering over additional agent-state fields. These techniques may help support stable and reproducible routing decisions, rebuttal assignments, and synthesis contributions under concurrency.

Drift-Detection and Numerical Stability

The system may detect semantic drift by comparing each agent output embedding v_t to the input-signal embedding p using cosine similarity.

An illustrative computation may include:

s_t=(v_t*p)/(norm(v_t)*norm(p))

To help ensure numerical stability, the denominator may be computed using epsilon-guarded norms:

norm_v_eps=max(norm(v_t), epsilon)

norm_p_eps=max(norm(p), epsilon)

The epsilon-guarded cosine similarity is then:

s_t=(v_t*p)/(norm_v_eps*norm_p_eps)

The input-signal norm norm_p_eps may be computed once per dialogue cycle and reused across all agents. Equivalent vector-space metrics may be used in alternative embodiments.

Illustrative Epsilon-Guarded Similarity Example

Consider the following embedding vectors:

v=(0.6, 0.8, 0.0)

u=(0.6, 0.0, 0.8)

epsilon=1e-8

The L2 norms are:

$$\mathrm{norm}(v)=1.0$$

$$\mathrm{norm}(u)=1.0$$

The epsilon-guarded norms are:

$$\mathrm{norm}(v)\_\mathrm{eps}=\max(1.0,\mathrm{epsilon})=1.0$$

$$\mathrm{norm}(u)\_\mathrm{eps}=\max(1.0,\mathrm{epsilon})=1.0$$

The dot-product is:

$$v*u=0.36$$

So the epsilon-guarded cosine similarity is:

$$\mathrm{cos\_eps}(v,u)=0.36/(1.0*1.0)=0.36$$

If one vector were near zero, for example:

w=(0.0, 0.0, 0.0)

Then:

$$\mathrm{norm}(w)\_\mathrm{eps}=\max(0.0,\mathrm{epsilon})=\mathrm{epsilon}$$

This prevents division by zero and yields a well-defined cosine similarity.

Circular Drift Buffer Storage and Atomic Updates

A drift-vector buffer may store similarity values over a rolling-window of size N. The buffer may be implemented as a circular buffer of length N, and each update may obtain a unique write position using a deterministic atomic fetch-and-add operation. This ordered-update sequence may help support reproducible rolling-window statistics under concurrent execution across GPU, CPU, FPGA, and distributed environments.

An illustrative ordered-update sequence may include:

```
prior=atomicAdd(head_ptr, 1ULL);
write_index=prior % N;
old=drift_buffer[write_index];
delta=s_t−old;
prior_sum=atomicAdd(sum_ptr, delta);
new_mean=(prior_sum+delta)/N;
atomicExchange_acq_rel(rolling_mean_ptr, new_mean);
drift_buffer[write_index]=s_t;
_threadfence_system( );
```

This ordered sequence, reading the outgoing slot, computing delta, performing an atomic RMW on sum_ptr, publishing rolling_mean_ptr, and then overwriting the buffer slot, may help preserve a running-sum invariant under concurrent updates.

Supported atomic mechanisms may include CUDA atomicAdd, ROCm atomic_fetch_add, OpenCL atomics, Metal atomics, Vulkan compute atomics, WebGPU atomics, CPU atomic primitives, FPGA logic, or any equivalent mechanism. On platforms lacking native 32-bit floating-point atomicAdd, equivalent semantics may be implemented using fixed-point integer atomics with scaling, CAS-based loops on the floating-point bit pattern, or a designated-writer thread with acquire-ordered readers. In long-running embodiments, a 64-bit device-side counter or a quiescent reset procedure may be used to mitigate counter wrap-around. After any device kernel that updates drift buffers, the host may perform a device synchronization before reading device-side buffers to help support visibility of device-side writes.

Fixed-Point Scaling Example

In some embodiments, platforms lacking native 32-bit floating-point atomicAdd may implement the running-sum update using fixed-point integer arithmetic. Similarity values s_t in the range [−1, 1] may be scaled by a factor S=2^s and stored as 64-bit integers.

An illustrative ordered sequence may include:

```
s_int=round(s_t*S);
scaled_delta=round((s_new−s_old)*S);
atomicAdd(&running_sum_int, scaled_delta);
rolling_mean=running_sum_int/(N*S);
```

A non-limiting numeric-example: for N=16 and similarity values in [−1, 1], choosing S=2^24 and a 64-bit accumulator ensures that the maximum accumulated magnitude (16*2^24) fits within a signed 64-bit integer. This embodiment may help support preservation of the running-sum invariant and may provide deterministic, platform-portable semantics when floating-point atomics are unavailable.

Drift-Threshold Evaluation

Drift may be detected when the rolling-window mean similarity falls below a configurable threshold theta_d.

An illustrative evaluation may include:

```
rolling_mean=(1.0/N)*sum_of_last_N_values;
if (rolling_mean<theta_d) {
  drift detected=true;
}
```

The drift-threshold theta_d may be static, dynamically adjusted based on alignment-metrics, modified through user-directed nudging, or learned from historical behavior. Non-limiting example values may range from 0.65 to 0.90.

Corrective Actions

When drift is detected, the system may apply one or more corrective actions. Corrective actions may include adjusting cognitive-style parameters (for example, creativity bias, evidence weight, rebuttal_threshold), reweighting contributions in the synthesis module, regenerating or reinitializing embeddings, reassigning or reinitializing agent roles, resetting routing priorities, or partially resetting selected fields in the agent-state tensor.

In some embodiments, drift-detection may trigger a partial reset of selected tensor fields (for example, recent embedding slots or alignment traces); in other embodiments it may trigger a full reinitialization of agent embeddings or routing logic. Corrective actions may be recorded in the correction_log with a Lamport timestamp or vector clock to enable deterministic reconciliation and audit in distributed deployments.

Goal-Alignment Engine

The goal-alignment engine may evaluate whether agents are collectively progressing toward a coherent, non-redundant, and evidence-supported output. For each agent, the engine may compute three primary metrics: coherence, redundancy, and evidence-consistency. These metrics may operate on token-level or embedding-level representations and may be computed on GPU, CPU, or specialized accelerators.

Coherence may measure how well an agent output aligns with a reference-embedding r. An illustrative computation may include:

coherence_i=(x_i*r)/(norm(x_i)*norm(r))

Cosine similarity may use the epsilon-guarded norm rule. The reference-embedding r may be the input-signal embedding, the previous cycle synthesized output, or a running-consensus vector. Coherence values may be smoothed using an exponential moving average with smoothing factor lambda in the range 0.1 to 0.9.

Redundancy may penalize agents whose outputs duplicate content produced by others. An illustrative computation may include:

redundancy_i=max_{j!=i}((x_i*x_j)/(norm(x_i)*norm(x_j)))

Redundancy thresholds may be configurable, for example in the range 0.70 to 0.95.

Evidence-consistency may measure whether an agent output aligns with a shared evidence pool E={e_1, . . . , e_K}. An illustrative computation may include:

evidence_i=(1.0/K)*sum_{k=1 . . . K}((x_i*e_k)/(norm(x_i)*norm(e_k)))

Alternative embodiments may incorporate token-level factuality checks, citation matching, retrieval-augmented verification, or contradiction-detection.

Unified Alignment-Score

The three metrics may be combined into a unified alignment-score. An illustrative computation may include:

A_i=gamma_1*coherence_i−gamma_2*redundancy_i+gamma_3*evidence_i

The coefficients gamma_1, gamma_2, and gamma_3 may lie in the range 0.1 to 3.0. These coefficients may be static, learned, dynamically adjusted based on drift status, influenced by user nudges, or optimized through system objectives. Alignment-scores may influence rebuttal routing priorities, synthesis weighting, drift-correction behavior, or agent role reinitialization. In some embodiments, alignment-scores may be normalized across agents using softmax or min-max scaling.

Synthesis Module

The synthesis module may aggregate agent outputs using weighted vector operations. Each agent may contribute an embedding vector x_i, and the system may compute a corresponding weight w_i that reflects conflict-intensity, drift status, and alignment quality.

An illustrative synthesis computation may include:

S=sum_i (w_i*x_i)

This weighting mechanism may emphasize agents that are coherent, non-redundant, and aligned with the input-signal, while down-weighting agents exhibiting drift or unjustified conflict. If alignment-scores use cosine similarity, the epsilon-guarded norm rule may be applied. Equivalent vector-space metrics may be used in alternative embodiments.

Weighted Aggregation Process

In one embodiment, the synthesis process may compute weights from conflict, drift, and alignment-metrics, form the synthesized vector S by summing w_i*x_i, and decode S into natural-language output using a decoding function.

Weight Computation

In one embodiment, weights may be computed using a softmax over a linear-combination of metrics. An illustrative computation may include:

w_i=exp(alpha*C_i+beta*A_i−delta*Di)
/
sum_j exp(alpha*C_j+beta*A_j−delta*D_j)

Here C_i is conflict-intensity, A_i is alignment-score, D_i is drift-magnitude, and alpha, beta, and delta are tunable coefficients in the range 0.1 to 3.0. This formulation may yield normalized, differentiable weights that adjust smoothly as agent behavior changes.

Numeric Example

Consider three agents with the following values:

Agent 1: C=0.2, A=0.8, D=0.1
Agent 2: C=0.5, A=0.6, D=0.2
Agent 3: C=0.1, A=0.4, D=0.4
alpha=1.0
beta=1.0
delta=1.0

The resulting normalized weights are approximately:

w1=0.46
w2=0.39
w3=0.15

This example illustrates how drift, conflict, and alignment may jointly influence synthesis weighting.

Decoding the Summary Vector

The summary vector S may be decoded into natural-language using a transformer-based decoder. The vector S may be projected into the decoder hidden dimension via a learned linear layer and used as an initial hidden-state or as an additional conditioning token. The decoder may generate a token sequence using beam-search, top-K sampling, nucleus-sampling, or temperature-scaled sampling. Non-limiting hyperparameters may include hidden size 512 to 4096, decoder depth 6 to 48 layers, attention heads 8 to 64, beam width 1 to 8, and sampling temperature 0.7 to 1.3.

Alternative Synthesis Embodiments

In alternative embodiments, the system may employ attention-based weighting, mixture-of-experts gating, rule-based weighting driven by user nudges, uniform weighting when drift is absent, hierarchical-aggregation pipelines, or graph-based aggregation using the dialogue turn graph.

An attention-based embodiment may compute:

S=sum_i (Attn(q, x_i)*x_i)

where Attn(q, x_i) denotes an attention score between a query vector q and an agent contribution vector x_i. These alternatives may be useful in scenarios where linear or softmax-based weighting provides limited ability to capture cross-agent dependencies, hierarchical structure, or user-directed constraints. Each embodiment may integrate into the deterministic synthesis pipeline and may operate on GPU, TPU, CPU, or FPGA/ASIC aggregation engines while helping preserve reproducible aggregation behavior.

User-Directed Nudging

The system may allow users to adjust conflict thresholds, drift sensitivity, cognitive-style parameters, routing priorities, and other system-level controls during the reasoning process. These adjustments ("nudges") may provide a mechanism for real-time steering of agent behavior. A nudge may modify scalar parameters such as conflict thresholds, vector parameters such as cognitive-style embeddings, or weighting coefficients used in routing and synthesis. Nudges may be applied through a graphical interface, a programmatic API, or a command-level instruction.

Nudge Propagation and Parameter Update

Nudges may update the agent-state tensor and may influence subsequent dialogue cycles by modifying conflict weighting, drift-related behavior, or synthesis weighting. For example, increasing drift sensitivity may lower the drift-threshold theta_d, enabling earlier detection of semantic divergence. Adjusting routing priorities may increase or decrease the influence of conflict-intensity or topic-divergence in rebuttal-target selection. Modifying cognitive-style parameters may shift an agent toward more analytical, creative, or conservative reasoning patterns.

These updates may propagate into the next cycle's similarity computation, alignment scoring, and synthesis weighting, enabling iterative, user-guided exploration and adaptive-control. In some embodiments, nudges may be applied through a parameter-update function:

P=update(P, Delta)

where P is the current parameter set, Delta is the user-specified adjustment, and P is the updated parameter set stored in the agent-state tensor. Other embodiments may smooth nudges over multiple cycles using exponential decay or may trigger immediate reinitialization of selected agent roles.

Illustrative Implementation Characteristics

Embodiments of the invention may be associated with computational, memory-access, convergence-related, or output-related characteristics that arise from the use of specialized data structures, adaptive-control mechanisms, vector-space operations, and hardware-accelerated computations. These characteristics may reflect the behavior of particular implementations and are not intended to imply any specific performance advantage.

Contiguous Agent-State Tensor

A technical effect may derive from the contiguous agent-state tensor, which stores per-agent parameters and embeddings in a compact, row-major layout. This structure may enable single-kernel, vectorized similarity and aggregation operations across agents, may reduce redundant embedding access, and may support favorable cache-locality behavior on GPU and TPU architectures. The structural linkage from the contiguous agent-state tensor to single-kernel vectorized similarity, to drift-buffer updates, to adaptive routing, and to synthesis may provide a concrete mechanism for the claimed operations of similarity computation, drift-detection, rebuttal routing, and weighted synthesis.

Reduced Recomputation Overhead

By storing agent embeddings, cognitive parameters, and historical outputs in a contiguous tensor, the system may avoid repeated embedding generation and context reconstruction. This arrangement may support fewer kernel invocations and may promote favorable cache-locality behavior, which in some implementations may be associated with reduced computational load.

Memory Locality Considerations

The use of contiguous tensor layouts and structured buffers, such as the drift-vector buffer and goal-alignment matrix, may enable vectorized operations and may reduce memory fragmentation. In some implementations, this arrangement may support favorable throughput characteristics on GPU and TPU architectures and may facilitate execution of similarity computations and aggregation routines.

Accelerated Similarity Computation

Embedding-based similarity metrics, including cosine similarity and topic-divergence measures, may be computed using hardware-accelerated vector operations. This may allow the system to evaluate semantic drift, conflict-intensity, and alignment-metrics at scale with minimal latency in some implementations.

Convergence-Related Behavior

The drift-detection mechanism may monitor semantic divergence over rolling-windows and may trigger corrective actions when drift exceeds a threshold. This may help maintain coherent dialogue trajectories and may support alignment with user-specified intent across reasoning-cycles.

Rebuttal-Routing Behavior

The conflict-weighted routing function may direct rebuttals toward selected targets based on conflict-related metrics, which may reduce redundant agent interactions and may support structured exploration of the reasoning space.

Adaptive Synthesis Weighting

The synthesis module may aggregate agent contributions using weights derived from conflict-intensity, drift status, and alignment-metrics. This may influence the characteristics of the synthesized output and may help ensure that contributions reflect the selected weighting criteria.

User-Directed Adaptability

The system may allow users to adjust conflict thresholds, drift sensitivity, cognitive-style parameters, and routing priorities during the reasoning process. These adjustments may propagate through the agent-state tensor and may influence subsequent dialogue cycles, enabling user-directed control.

Ablation and Component Interaction

Contiguous storage, drift buffering, and conflict-weighted routing may each provide distinct functional roles, and the claimed invention may rely on their combination to support the described technical effects. A contiguous tensor layout may support single-kernel execution patterns but may not, by itself, provide temporal-alignment signals for rebuttal coordination. Drift-detection may identify divergence, but without a contiguous layout, may involve repeated embedding access and multiple kernel interactions. Conflict-weighted routing may balance participation, but without drift buffering, may not capture gradual semantic shifts that influence routing and synthesis behavior.

The combination of a contiguous agent-state tensor enabling single-kernel vectorized similarity, a drift-vector buffer providing temporal-alignment context, and conflict-weighted routing that uses alignment-scores to reweight and target rebuttals may produce a coordinated technical effect. In some implementations, this interaction may be associated with reduced recomputation, favorable memory-access patterns, and stable convergence behavior that may not be evident from considering the individual components in isolation. This coordinated behavior may support multi-agent stability across GPU, CPU, and distributed environments. Where cosine-based metrics are used, the epsilon-guarded norm rule may help maintain numerical stability across all components of the interaction.

Representative Performance Effects

In various embodiments, the disclosed architecture may exhibit performance-related effects associated with computational behavior and system-level characteristics. These effects may include fewer recomputation cycles, particular memory-access patterns, lower GPU activity levels, convergence-related behavior, and reduced token-generation load. The specific magnitudes of such effects may depend on hardware configuration, model size, and implementation details, and the ranges provided herein are illustrative of potential characteristics rather than guaranteed outcomes.

Additional Embodiments and Variations

The embodiments described herein may illustrate representative implementations of the inventive concepts. Variations, modifications, substitutions, and alternative configurations may be employed without departing from the scope of the invention. The components, data structures, and algorithms described may be combined, reordered, omitted, or supplemented in various ways to accommodate different computational-environments, reasoning tasks, or resource constraints.

Further variations are also contemplated. In additional embodiments, deterministic update-ordering may be selectively relaxed to support stochastic exploration, approximate routing, or throughput-oriented execution paths. Embodiments may employ partial-state, sparse, lazy-update, or delta-encoded agent-state structures, including quantized, compressed, block-tiled, or mixed-precision formats. Semantic-change metrics may be computed using symbolic similarity, rule-based heuristics, graph-distance metrics, or hybrid symbolic-neural scoring functions. Agents may be neural, symbolic, retrieval-based, rule-based, or hybrid models, and may operate in streaming or continuous-input environments in which drift-detection, routing, and synthesis update incrementally as new data arrives.

In some embodiments, routing, drift-related behavior, or synthesis weighting may be formulated as multi-objective optimization problems balancing coherence, diversity, evidence-consistency, latency, energy consumption, or user-directed constraints. Agents may update one another's parameters through cross-agent distillation, shared-memory learning, or cooperative adaptation. Distributed embodiments may extend alignment scoring, routing, or synthesis across devices using deterministic-merge protocols, consensus-based ordering, or hierarchical controller coordination. Embodiments may incorporate energy-aware, latency-aware, or cost-aware scheduling that adjusts agent execution frequency, drift-buffer update cadence, or synthesis granularity based on resource considerations.

Security-sensitive embodiments may incorporate adversarial-robust similarity metrics, anomaly-resistant drift-detection, or adversarial-weighted routing and synthesis. Safety-mode operation may filter, suppress, or escalate agent outputs based on drift-magnitude, alignment anomalies, or user-defined safety policies. These variations are illustrative and non-limiting and may be combined with any embodiments described herein while preserving deterministic behavior where required.

Alternative Execution Models

Additional embodiments may incorporate alternative execution models, data layouts, or optimization strategies that differ from the representative implementations described above. For example, certain embodiments may employ distributed or multi-node execution, hierarchical agent groupings, platform-specific acceleration techniques, or adaptive weighting schemes. These variations may remain within the scope of the inventive concepts and may be adapted to different hardware environments, resource requirements, or application domains.

Dynamic Agent Population

In some embodiments, the number of agents may vary dynamically based on task complexity, available computational resources, or user preference. Agents may be instantiated, suspended, or terminated during the reasoning process. The agent-state tensor may expand or contract accordingly, and the dialogue controller may update routing logic to reflect the active agent set.

Cognitive Style Representations

Cognitive styles may be defined using parameter vectors, rule-based heuristics, learned embeddings, or hybrid representations. Cognitive styles may evolve over time through reinforcement-learning, gradient-based updates, or user-directed adjustments. The system may maintain a historical record of cognitive-style changes to support interpretability, auditing, or rollback.

Alternative Similarity Metrics and Configurability

The drift-detection mechanism may employ alternative similarity metrics, including Euclidean distance, Manhattan distance, dot-product similarity, or learned similarity functions. Rolling-window sizes may be configurable (non-limiting examples include values from 2 to 50), and drift-thresholds may be static, adaptive, or learned from historical behavior. Implementations may select metric and window parameters appropriate to the embedding-space, model scale, and application requirements.

Extended Routing Factors

The conflict-weighted routing function may incorporate additional factors such as agent reliability, historical accuracy, domain expertise, or user-specified priorities. In some embodiments, the routing function may be learned using supervised or reinforcement-learning techniques, with training data derived from prior multi-agent interactions, human feedback, or simulated dialogues. Routing models may be trained offline and deployed as part of the controller or updated online using incremental-learning procedures.

Additional Alignment-Metrics

The goal-alignment engine may compute additional metrics such as novelty, factuality, or contradiction-detection. Alignment-scores may be aggregated using linear-combinations, nonlinear transformations, or neural-network-based scoring models. Alignment-metrics may be computed at multiple granularities, including token-level, sentence-level, paragraph-level, or embedding-level comparisons, and may be combined using hierarchical or ensemble strategies.

Alternative Synthesis Strategies

The synthesis module may employ alternative aggregation strategies, including max pooling, min pooling, and attention-based weighting:

S=sum_i Attn(q, x_i)*x_i

Graph-based aggregation using the dialogue-turn graph, mixture-of-experts models, or hierarchical summarization pipelines may also be used. Implementations may select a synthesis strategy based on latency, memory, and configurability considerations appropriate to the deployment environment.

Memory-Augmented Reasoning

In some embodiments, the system may incorporate memory-augmented reasoning, where agent outputs and synthesized summaries are stored in a long-term memory buffer. The buffer may be indexed using vector-similarity search, hash-based lookup, or graph-based retrieval. Retrieved memories may influence agent responses, conflict routing, or synthesis weighting and may be subject to retention policies, relevance scoring, and privacy constraints.

Synchronous and Asynchronous Modes

The system may operate in synchronous or asynchronous modes. In synchronous mode, all agents may respond in coordinated cycles and the controller may advance in lockstep. In asynchronous mode, agents may respond at different times and the dialogue controller may update routing and synthesis incrementally, reconciling out-of-order updates using epoch markers, Lamport timestamps, or coordinator-mediated ordering.

Hardware Acceleration and Lightweight Deployments

Hardware acceleration may vary based on deployment environment. GPU or TPU acceleration may be used for embedding generation, similarity computation, or tensor operations. In lightweight or edge deployments, CPU-only execution may be used with reduced embedding dimensionality, quantized models, or simplified routing logic to meet resource constraints.

Domain-Specific Modules

In some embodiments, the system may incorporate domain-specific modules such as medical-reasoning agents, legal-analysis agents, financial-modeling agents, or scientific-hypothesis-generation agents. These modules may include specialized knowledge bases, retrieval mechanisms, domain-tuned embeddings, and domain-specific evaluation metrics.

Deployment Topologies

The system may be deployed in cloud environments, on-device environments, distributed clusters, or hybrid configurations. Communication between agents and controller components may occur through shared-memory, message queues, RPC calls, or distributed event streams. Deployment topologies may include single-host, multi-host, or federated arrangements with persisted epoch markers and recovery protocols to preserve deterministic ordering.

Consider a configuration with the following parameters:

M=3 agents embedding dimension D=4 drift buffer size N=3 drift-threshold theta_d=0.75 routing coefficients: alpha=1.0, beta=0.5

Agent Embeddings:

x1=[0.2, 0.5, 0.1, 0.9]

x2=[0.6, 0.1, 0.3, 0.2]

x3=[0.1, 0.2, 0.8, 0.4]

Input-Signal Embedding:

p=[0.3, 0.4, 0.2, 0.7]

Cosine Similarities Computed Using Epsilon-Guarded Norms:

s1=0.979 s2=0.673 s3=0.676

These values may be written into the circular drift buffer.

The Rolling-Mean is:

mu=(0.979+0.673+0.676)/3=0.776

Since mu>theta_d, no drift-correction is triggered.

Pairwise Conflict Scores May be Computed Using:

C_ij=1−cos(x_i, x_j)

Divergence scores D_i may be evaluated. Routing priorities may be computed using:

p_i=alpha*C_i+beta*D_i

Synthesis weights w_i may be derived from conflict, drift, and alignment-metrics.

The final synthesis vector may be:

S=sum_i (w_i*x_i)

This vector may be decoded into the output using the configured decoder.

This illustrative example uses small values (for example, D=4 and N=3) for clarity and is non-limiting. Production systems may use embedding dimensions between 128 and 1024 and larger agent counts. Example non-limiting parameter ranges may include:

N between 3 and 20 theta_d between 0.65 and 0.90 alpha and beta between 0.1 and 2.0 gamma_1, gamma_2, gamma_3 between 0.1 and 3.0 embedding dimension D between 128 and 1024

Technical Effects

By storing agent embeddings, cognitive-style parameters, drift-buffer values, and alignment-metrics in a contiguous agent-state tensor, the system may avoid repeated embedding generation and redundant context reconstruction. This arrangement may be associated with fewer GPU kernel interactions, may promote favorable cache-access patterns, and may correspond to particular computational behavior in some implementations.

The use of contiguous tensor layouts, circular drift buffers, and structured alignment matrices may support coalesced memory-access patterns and vectorized operations. These characteristics may align with GPU and TPU memory hierarchies and, in some implementations, may be associated with particular throughput or latency characteristics during similarity computation and synthesis.

Cosine similarity, topic-divergence metrics, and evidence-consistency scores may be computed using hardware-accelerated vector operations. In some embodiments, these computations may be performed within a single kernel invocation across agents, which may support coordinated multi-agent behavior and may reduce synchronization interactions.

The drift-detection mechanism may monitor semantic-alignment over rolling-windows and may trigger corrective actions when drift exceeds a threshold. This behavior may help maintain coherent reasoning trajectories and may support alignment with user-directed intent across extended reasoning sequences.

The conflict-weighted routing function may direct rebuttals toward semantically relevant disagreements. This routing behavior may limit redundant agent interactions and may support structured exploration of the reasoning space.

The synthesis module may aggregate agent contributions using weights derived from conflict-intensity, drift-magnitude, and alignment-scores. This weighting behavior may influence the characteristics of the synthesized output and may help ensure that contributions reflect the selected weighting criteria.

The system may allow users to adjust conflict thresholds, drift sensitivity, cognitive-style parameters, and routing priorities during the reasoning process. These adjustments may propagate through the agent-state tensor and may influence subsequent dialogue cycles, supporting user-directed control.

Ablation Analysis

Ablation analysis may indicate that the combination of contiguous tensor storage, drift buffering, and conflict-weighted routing may produce coordinated technical effects that may not be apparent when the components are considered individually. The integrated architecture may be associated with particular throughput characteristics, multi-agent stability, and output consistency through the coordinated operation of these elements. These effects may arise from fewer kernel interactions, particular memory-access patterns, and deterministic update-ordering, supporting hardware-level execution across GPU, CPU, and distributed environments.

Variations, modifications, substitutions, and alternative configurations may be employed without departing from the scope of the invention.

Distinguishing Features

This subsection highlights certain architectural features and interactions among components described in the disclosed embodiments.

In some embodiments, the system may employ specialized data structures, deterministic update-rules, drift-monitoring mechanisms, conflict-weighted routing, and alignment-based synthesis weighting. These elements may operate together to support structured multi-agent reasoning, coordinated dialogue cycles, and adaptive behavior across heterogeneous-hardware environments.

For example, certain embodiments may include a contiguous agent-state tensor that stores cognitive parameters, embeddings, drift indicators, and behavioral tendencies in a row-major layout; a drift-vector buffer that maintains rolling-window similarity metrics with atomic running-sum invariants; a goal-alignment engine that computes coherence, redundancy, and evidence-consistency metrics; a conflict-weighted routing function that prioritizes rebuttals using conflict-intensity and topic-divergence with deterministic tie-breaking; and a synthesis module that aggregates agent outputs using dynamically computed weights. Additional embodiments may employ hardware-accelerated vector operations that combine dot-product similarity, deterministic circular-buffer indexing, and atomic rolling-sum updates, as well as user-directed nudging mechanisms that adjust agent parameters during reasoning.

In some embodiments, a single GPU kernel may perform dot-product similarity computation, deterministic circular-buffer indexing via atomic fetch-and-add, and atomic rolling-sum updates within a unified execution pass. Such embodiments may implement an ordered-update sequence including: reading an outgoing slot, computing a delta, performing an atomic read-modify-write on the running-sum, publishing a rolling-mean, and overwriting the slot.

Additional embodiments may support structured, adaptive multi-agent reasoning with drift-related behavior, alignment scoring, and conflict-weighted routing. These embodiments may incorporate a contiguous agent-state tensor, drift-buffer structures, deterministic update-rules, and vector-space-based reasoning mechanisms to support coherent multi-agent interaction across diverse hardware platforms.

The following table provides illustrative, high-level descriptions of selected architectural features of the disclosed embodiments. The table is conceptual, non-exhaustive, and offered solely to highlight representative aspects of the described architecture.

Architectural Considerations

Certain embodiments may employ deterministic circular-buffer indexing using atomic fetch-and-add operations, atomic running-sum updates performed within a single hardware-accelerated kernel, and contiguous-tensor agent-state storage combined with unified similarity computation. These elements may operate together to support coordinated multi-agent reasoning, particular memory-access behavior, and reproducible update patterns.

In some embodiments, a single GPU kernel may perform vector-similarity evaluation, drift-buffer indexing, and rolling-sum updates within one execution pass using deterministic atomic ordering. Such embodiments may avoid intermediate synchronization stages and may support predictable execution behavior across heterogeneous-hardware platforms.

Additional embodiments may combine rolling-window drift evaluation, conflict-weighted rebuttal routing, alignment-based synthesis weighting, contiguous-tensor memory structures, and hardware-accelerated vector operations. The interaction of these elements may be associated with fewer recomputation cycles, particular memory-access patterns, lower kernel-interaction counts, and multi-agent convergence-related behavior. The coordinated operation of these components may correspond to particular computational characteristics within the disclosed architecture.

Non-Obviousness Rationale

The interactions among drift control, conflict-weighted routing, alignment scoring, and synthesis weighting may produce coordinated technical effects that arise from their combined operation rather than from any individual element in isolation. In some embodiments, these effects may emerge from the use of contiguous-tensor storage, deterministic atomic-update-ordering, and rolling-window drift evaluation, which together may be associated with fewer kernel-interaction events, particular memory-access patterns, and consistent behavior across GPU, CPU, and distributed environments. The disclosed embodiments integrate these elements into a unified architecture that may support coherent multi-agent reasoning.

Summary of Technical Effects

The embodiments described herein may exhibit technical effects arising from the combined use of (i) contiguous tensor-based agent-state storage, (ii) single-kernel similarity computation with deterministic atomic-update-semantics, (iii) rolling-window drift-detection, (iv) conflict-weighted rebuttal routing, and (v) alignment-based synthesis weighting. The integrated architecture may be associated with fewer kernel-interaction events, particular memory-access patterns, and deterministic update-ordering, which together may support coherent multi-agent reasoning across GPU, CPU, and distributed environments.

Memory-Locality Characteristics

Storing agent embeddings, cognitive parameters, and drift indicators in a contiguous agent-state tensor may support coalesced access patterns, may promote favorable cache behavior, and may enable vectorized memory operations during similarity computation.

Reduced Recomputation and Kernel-Launch Behavior

Consolidating dot-product similarity, drift indexing, and rolling-sum updates into a single GPU kernel may reduce multi-kernel orchestration, may limit global-memory traffic, and may avoid redundant traversal of agent embeddings.

Deterministic Update-Ordering

Atomic fetch-and-add indexing and atomic running-sum updates may provide deterministic circular-buffer behavior under parallel execution, reducing race-condition risk and non-deterministic scheduling effects common in multi-kernel pipelines.

Convergence-Related Behavior

Drift-detection combined with conflict-weighted rebuttal routing and alignment-based synthesis weighting may help manage semantic drift, may support coherent reasoning across multiple rounds, and may be associated with convergence-related behavior aligned with user-directed objectives.

Scalable Multi-Agent Coordination

Structured rebuttal cycles and targeted conflict routing may support coordinated multi-agent reasoning without exponential growth in message passing or redundant computation.

Hardware-Accelerated Vector Operations

GPU- and TPU-oriented similarity computation combined with deterministic atomic-update-semantics may be associated with particular throughput characteristics and latency behavior. The specific characteristics may vary based on hardware configuration, embedding dimensionality, agent count, and implementation details.

Adaptive User Steering

Real-time user-directed adjustments may allow dynamic modification of agent parameters, conflict thresholds, and cognitive tendencies, supporting interactive control without requiring model retraining or pipeline reinitialization.

The combined operation of these mechanisms may be associated with coherent multi-agent behavior, stable system operation, and particular computational characteristics across a range of deployment environments.

Additional Implementation Considerations

Embodiments may operate in networked or distributed environments in which agents, controllers, or memory modules reside on different devices connected via local networks, cloud infrastructure, or hybrid deployments. In certain embodiments, a user interface may expose agent-states, drift metrics, alignment-scores, or synthesis outputs for interpretability, debugging, or interactive control. Embodiments may include calibration or training phases in which agent parameters, routing heuristics, or drift-thresholds are learned, fine-tuned, or adapted based on historical data or simulated dialogues. Safety-oriented deployments may employ safe-mode operation in which agent outputs are filtered, suppressed, or escalated to human review based on confidence, drift, or alignment-metrics. Embodiments may scale to large agent populations through sharding, hierarchical grouping, or distributed-controller coordination, and may employ neural, symbolic, rule-based, or hybrid agent models. Minimal configurations may operate with a single agent, with drift-detection, routing, and synthesis modules disabled or simplified. The invention may be embodied as computer-executable instructions stored on a non-transitory computer-readable medium that, when executed by one or more processors, perform the methods described herein.

CPU Implementation Sketch

This subsection provides enablement for the CPU fallback embodiment recited in claim 22.

In one embodiment, the system may execute similarity computation, drift-buffer updates, and rolling-mean maintenance entirely on CPU hardware using platform-appropriate atomic primitives. A representative CPU implementation may use a thread pool in which each worker thread processes a subset of agents. Each worker may perform the following ordered steps:

```
for each agent i assigned to this thread:
    // dot-product
    dot=0
    for k in 0 . . . D−1:
        dot+=agent_embeddings[i][k]*input_signal_embedding[k]
    // epsilon-guarded cosine similarity
    denom=max(agent_norms[i]*input_signal_norm, eps)
    sim=dot/denom
    // deterministic circular buffer indexing via CAS loop
    prior=atomic_fetch_add_CAS(&head_ptr, 1) // returns
      prior value
```

```
write_index=prior % N
// read outgoing value before overwrite
old=atomic_load_acquire(&drift_buffer[write_index])
// compute delta and update running-sum
do:
  cur=atomic_load_acquire(&sum_ptr)
  cand=cur+(sim−old)
while (!atomic_compare_exchange_strong_acq_rel
  (&sum_ptr, &cur, cand))
new_mean=cand/N
// publish rolling-mean
atomic_store_release(&rolling_mean_ptr, new_mean)
// overwrite buffer slot
drift_buffer[write_index]=sim
```

The CAS loop may provide deterministic serialization of updates to sum_ptr, helping ensure that the running-sum invariant is preserved. CPU embodiments may use C++ std::atomic with memory_order_acquire, memory_order_release, and memory_order_acq_rel semantics. Equivalent semantics may be implemented using platform-specific intrinsics on x86 or ARM architectures. A designated-writer variant may be used when atomic floating-point operations are unavailable. Other CPU-based implementations are contemplated.

Distributed Embodiment Notes

In distributed or multi-node deployments, each node may maintain a local drift buffer, local running-sum, and local rolling-mean. Each update may be tagged with a Lamport timestamp or vector-clock value. Nodes may periodically transmit (Delta, timestamp) pairs to a coordinator. The coordinator may merge updates in deterministic timestamp order, ensuring that the global running-sum reflects the same logical sequence of updates that would occur on a single device.

A representative distributed merge procedure may be:

```
receive (delta, ts) from node j
insert into priority queue ordered by ts
while head of queue has next expected timestamp:
  global_sum+=delta
  global_mean=global_sum/N
  advance expected timestamp
```

Nodes may request index blocks from a host-coordinated global counter to ensure unique write positions across devices. The host may persist the global counter or epoch markers to durable storage to enable recovery after failures. Partially allocated blocks may be invalidated using epoch-based reconciliation.

Distributed embodiments may use RPC, message queues, shared-nothing coordination, or distributed event streams. Equivalent deterministic-merge strategies are contemplated.

General Statement of Scope

The foregoing description of embodiments has been presented for purposes of illustration and explanation. It is not intended to be exhaustive or to limit the disclosure to the precise forms disclosed. Numerous modifications, variations, substitutions, and alternative configurations may be apparent to persons skilled in the art in light of the teachings herein.

The specific structures, data representations, algorithms, and control flows described may be implemented in hardware, software, firmware, or any combination thereof. Components described as modules, engines, controllers, or buffers may be implemented as discrete elements, integrated subsystems, or distributed processes operating across multiple computing devices.

The terminology used herein is intended to describe particular embodiments only and is not intended to be limiting. As used herein, the singular forms "a," "an," and "the" may include plural forms unless the context clearly indicates otherwise. The terms "comprising," "including," and "having" are inclusive and do not exclude additional elements or steps.

The scope of the disclosure is defined by the appended claims. Any features, elements, or embodiments described herein but not explicitly recited in the claims should be understood as optional unless expressly stated otherwise. All modifications, equivalents, and alternatives falling within the spirit and scope of the claims are intended to be covered.

What is claimed is:

1. A computer-implemented method, executed on one or more hardware-accelerated processors, comprising: storing, in a contiguous agent-state tensor, cognitive-style parameters, role identifiers, historical embeddings, drift indicators, behavioral tendencies, and agent-level meta-metrics; generating, using a hardware-accelerated embedding model, one or more input-signal embeddings; computing vectorized similarity metrics between each agent embedding and each input-signal embedding; maintaining a drift-vector buffer storing similarity values over a rolling-window of size N; computing a rolling-window drift statistic from a running-sum maintained in memory accessible to the processors; updating similarity values and drift statistics in a deterministic update sequence using ordered memory semantics that preserve a consistency invariant; detecting semantic drift by comparing the computed rolling-window drift statistic to a configurable drift-threshold; computing conflict-intensity and topic-divergence scores for agent outputs; routing rebuttals among the agents using a conflict-weighted priority function with deterministic tie-breaking; and synthesizing agent outputs using a weighted aggregation function based on one or more conflict-intensity, drift status, alignment-metrics, or agent-level meta-metrics; wherein the consistency invariant is that the rolling-window drift statistic is based on the similarity values most recently written to the drift-buffer; and wherein the deterministic update sequence and ordered memory semantics previously recited are implemented by the hardware-accelerated processors to provide a machine-enforced execution ordering that is integral to maintaining the consistency invariant.

2. The method of claim 1, wherein conflict-intensity Cij is computed as Cij=1−cos(xi, xj).

3. The method of claim 1, wherein the priority function comprises a weighted combination of conflict-intensity and topic-divergence.

4. The method of claim 1, wherein the drift-threshold is configurable or user-adjustable.

5. The method of claim 1, wherein the rolling-window size N is adaptive.

6. The method of claim 1, wherein each agent has an agent-specific drift-threshold stored in the agent-state tensor.

7. The method of claim 1, wherein the drift statistic comprises a rolling-window mean, an exponential moving average, a hybrid of the two, or another distribution-based metric including a median, trimmed mean, quantile, or spectral drift metric.

8. The method of claim 1, wherein semantic-change metrics comprise embedding similarity, token-distribution divergence, latent-state variance, kernel-based similarity, attention-based similarity, or learned similarity functions.

9. The method of claim 1, wherein routing or synthesis weighting is based on agent-level meta-metrics comprising reliability, calibration, stability, or trustworthiness.

10. The method of claim 1, wherein deterministic tie-breaking is performed using the composite key (priority, −sequence_number, agent_id) or another deterministic ordering rule including hash-based or timestamp-based ordering.

11. The method of claim 1, wherein updates to the drift-buffer are coordinated across multiple processors, GPUs, TPUs, or vectorized compute units using deterministic cross-device synchronization, including device-level ordering, cross-device drift-buffer merging, or deterministic multi-device update sequencing.

12. The method of claim 1, wherein similarity metrics or drift statistics are computed using reduced-precision arithmetic comprising FP16, BF16, INT8, or mixed-precision fused operations.

13. The method of claim 1, wherein similarity computation, drift-buffer updates, or conflict-metric evaluation are performed using heterogeneous cooperative execution across CPUs, GPUs, TPUs, or vectorized compute units, including partitioning operations between host processors and device-side kernels while preserving deterministic update-ordering.

14. The method of claim 1, wherein the agent-state tensor or drift-buffer is stored in a quantized, compressed, block-tiled, sparse, or mixed-precision representation, and wherein similarity metrics or drift statistics are computed directly on the compressed representation.

15. A computer system comprising one or more processors and a memory storing instructions that, when executed, cause the system to: maintain a contiguous row-major agent-state tensor; compute embeddings for input-signals using a hardware-accelerated embedding model; compute similarity metrics using vectorized operations; maintain a rolling-window drift-buffer and a running-sum in processor-accessible memory; compute a rolling-window drift statistic based on the running-sum; detect semantic drift by comparing the computed rolling-window drift statistic to a configurable threshold; compute conflict-intensity and topic-divergence scores; route rebuttals using a conflict-weighted routing function with deterministic tie-breaking; and synthesize agent outputs using a weighted aggregator based on conflict-intensity, drift status, alignment-metrics, or agent-level meta-metrics, the instructions being stored in the memory and/or on a non-transitory computer-readable medium; and wherein the vectorized operations and the conflict-weighted routing function with deterministic tie-breaking previously recited are implemented by the processors to provide machine-enforced execution behavior integral to the functioning of the computer system.

16. The system of claim 15, wherein deterministic ordering of drift-buffer updates is achieved using host-allocated index blocks, a coordinator-based merge protocol, ticket locks, hardware queue primitives, or per-block counters merged deterministically.

17. The system of claim 15, wherein the system performs a host-allocated index-block protocol that assigns deterministic write-index ranges to devices prior to device-side updates.

18. The system of claim 15, wherein the system implements a deterministic-merge protocol using logical timestamps to merge per-device updates while preserving the consistency invariant.

19. A computer-implemented method, executed on a GPU, TPU, or other vectorized compute unit, comprising executing a single fused device-side kernel that, for each agent processed in parallel: loading an agent embedding from a contiguous agent-state tensor; computing a similarity value between the agent embedding and an input-signal embedding using vectorized operations; obtaining a unique prior counter value by performing an atomic fetch-and-add on a device-side counter and computing a deterministic circular-buffer index; reading an outgoing similarity value from the drift-buffer at the computed index using acquire-ordered semantics; computing a delta between the new similarity value and the outgoing value; atomically updating a device-side running-sum using a deterministic atomic read-modify-write that preserves a running-sum invariant; computing a rolling-window drift statistic from the updated running-sum; publishing the updated rolling-window drift statistic to device-visible memory using acquire-release semantics; writing the new similarity value into the drift-buffer after the running-sum update; and issuing a device-level or system-level memory fence to promote host or cross-device visibility; the method further comprising detecting semantic drift by comparing the computed rolling-window drift statistic to a configurable threshold and adjusting agent routing or synthesis weighting in accordance with the detected drift; and wherein the deterministic atomic read-modify-write and the acquire-ordered and acquire-release semantics previously recited are enforced by the fused device-side kernel to provide machine-enforced execution behavior integral to the functioning of the vectorized compute unit.

20. The method of claim 19, wherein the drift-buffer is partitioned into shards and each shard is updated by a designated-writer that serializes updates for that shard and publishes updated drift statistics in deterministic order.

21. The method of claim 19, wherein the atomic running-sum update is implemented using native floating-point atomicAdd.

22. The method of claim 19, wherein the atomic running-sum update is implemented using a compare-and-swap loop using atomic_compare_exchange_strong with memory_order_acq_rel semantics.

23. The method of claim 19, wherein the atomic running-sum update is implemented using fixed-point integer atomics with a scaling factor S and an accumulator width W selected to provide a specified fractional precision and accumulator capacity appropriate for the rolling-window size N.

24. The method of claim 19, wherein drift-detection, disagreement computation, routing, or synthesis is performed using privacy-preserving, federated, encrypted, or secure-aggregation computation across multiple devices or nodes.

25. The method of claim 19, wherein drift-thresholds, routing policies, or aggregation weights are generated by a machine-learning model trained on historical agent interactions, semantic-change patterns, or task-performance outcomes.

26. The method of claim 19, wherein semantic-change metrics include multimodal metrics derived from one or more modalities selected from text, images, audio, video, sensor data, or cross-modal embeddings.

27. The method of claim 19, wherein synthesizing agent outputs comprises a hierarchical aggregation pipeline that combines agent contributions at multiple levels of abstraction including token-level aggregation, embedding-level aggregation, semantic-level aggregation, graph-based aggregation, mixture-of-experts gating, or reinforcement-learning-based weighting.

* * * * *